(12) United States Patent
Tsuboi

(10) Patent No.: US 6,443,634 B1
(45) Date of Patent: Sep. 3, 2002

(54) OPTICAL APPARATUS

(75) Inventor: Takayuki Tsuboi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/543,658

(22) Filed: Apr. 5, 2000

(30) Foreign Application Priority Data

Apr. 9, 1999 (JP) ............................................ 11-102996
Feb. 18, 2000 (JP) ........................................ 2000-040841

(51) Int. Cl.⁷ .......................... G03B 17/00; G03B 17/04
(52) U.S. Cl. .......................... 396/448; 396/79; 396/349; 359/511
(58) Field of Search ............................. 396/72, 79, 83, 396/448, 349; 359/511, 611, 612

(56) References Cited

U.S. PATENT DOCUMENTS

| 5,294,954 A | * | 3/1994 | Nomura et al. ............. 359/511 |
| 5,541,696 A | * | 7/1996 | Bittner ......................... 359/612 |
| 5,862,426 A | * | 1/1999 | Ichino et al. ................ 359/511 |
| 6,125,237 A | * | 9/2000 | Park ............................ 396/132 |
| 6,312,168 B1 | * | 11/2001 | Naruse et al. .............. 396/349 |

* cited by examiner

*Primary Examiner*—Alan A. Mathews
(74) *Attorney, Agent, or Firm*—Robin, Blecker & Daley

(57) ABSTRACT

An optical apparatus includes a barrier member disposed in front of a lens and arranged to be openable and closable, an urging member arranged to exert an urging force on the barrier member, and an abutting member arranged to be capable of abutting on the urging member, wherein, when the abutting member abuts on the urging member, the urging member exerts on the barrier member an urging force acting in a direction of closing the barrier member, and, when the abutting member does not abut on the urging member, the urging member exerts on the barrier member an urging force acting in a direction of opening the barrier member.

17 Claims, 28 Drawing Sheets

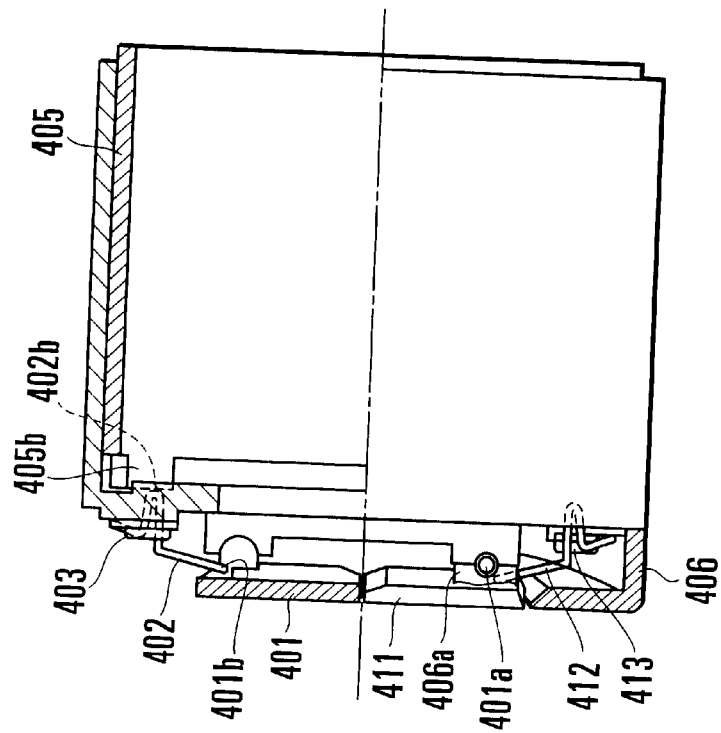
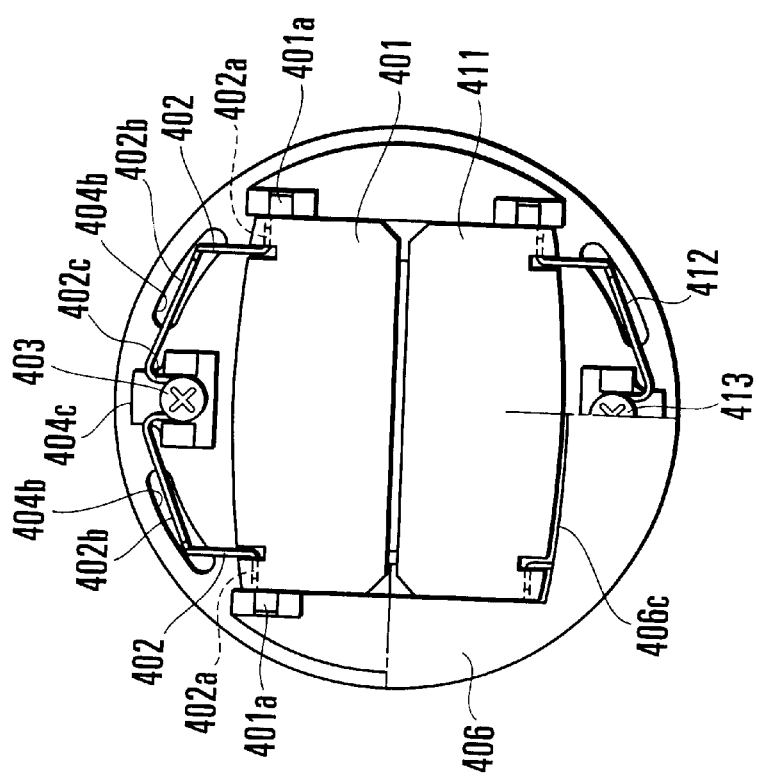

FIG. 25 (a)
FIG. 25 (b)
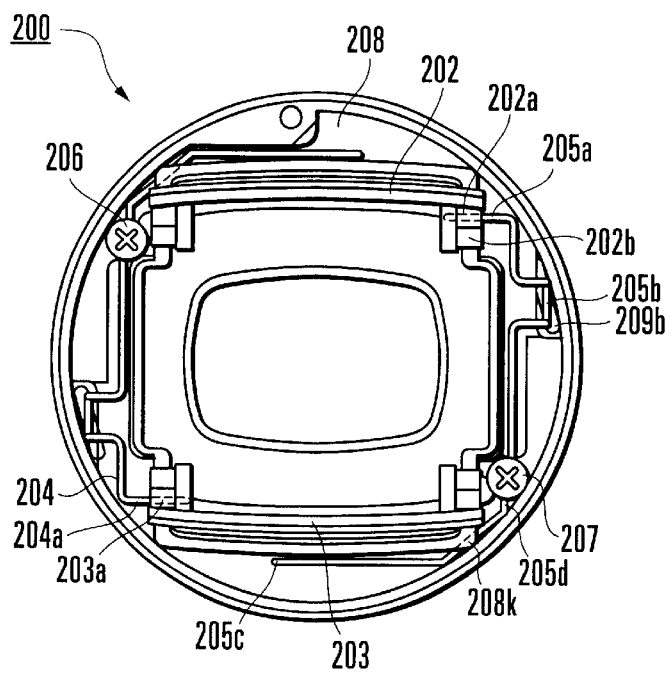
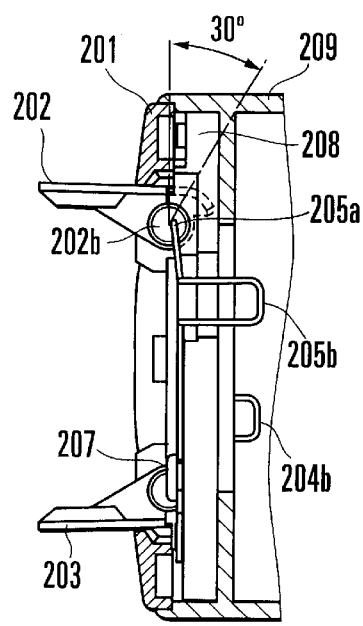
FIG. 25 (c)
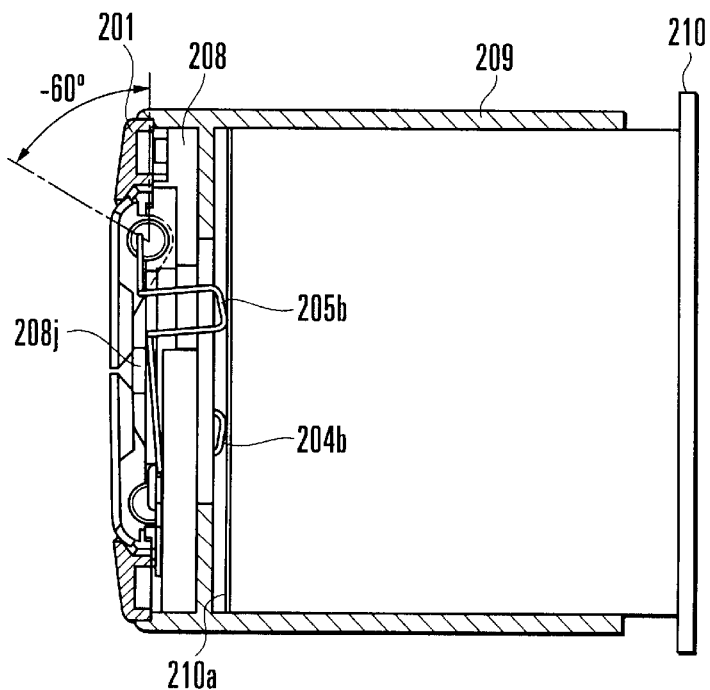

OPTICAL APPARATUS

BACKGROUND OF THE INVENTION

1. Field of the Invention

The present invention mainly relates to a zoom lens camera, and more particularly to a barrier opening-and-closing device and to a lens barrel and a camera having the barrier opening-and-closing device.

2. Description of Related Art

In a camera disclosed in Japanese Laid-Open Patent Application No. HEI 7-191380, a pair or a plurality of barrier members are arranged at the fore end part of a lens barrel to be opened and closed within a plane perpendicular to an optical axis by utilizing drawing-in and drawing-out motions of the lens barrel.

In another camera disclosed in Japanese Laid-Open Utility Model Application No. HEI 04-091341, a door-like barrier member is arranged at the fore end of a lens barrel to be manually opened toward an object of photo-taking.

However, the camera disclosed in Japanese Laid-Open Patent Application No. HEI 7-191380 necessitates use of a complex mechanism for driving the barrier members within the lens barel and also necessitates a large space for retracting the barrier members into the lens barrel in opening them.

In the barrier mechanism of the camera disclosed in Japanese Laid-Open Utility Model Application No. HEI 04-091341, the fore end of the barrier member is in a pointed shape when it is in an open state, and thus can not be used as a hood. Therefore, the camera necessitates a hood member to be arranged separately from a barrier member. This, however, causes an increase in the number of parts.

BRIEF SUMMARY OF THE INVENTION

In accordance with an aspect of the invention, there is provided a camera or an optical apparatus, which comprises a barrier member disposed in front of a lens and arranged to be openable and closable, an urging member arranged to exert an urging force on the barrier member, and an abutting member arranged to be capable of abutting on the urging member, wherein, when the abutting member abuts on the urging member, the urging member exerts on the barrier member an urging force acting in a direction of closing the barrier member, and, when the abutting member does not abut on the urging member, the urging member exerts on the barrier member an urging force acting in a direction of opening the barrier member, so that the structural arrangement of a barrier can be simplified.

The other and further aspects and features of the invention will become apparent from the following detailed description of preferred embodiments thereof taken in connection with the accompanying drawings.

BRIEF DESCRIPTION OF THE SEVERAL VIEWS OF THE DRAWING

FIGS. 5(*a*) and 5(*b*) are partly-broken enlarged views of the fore end of the lens barrel of the camera according to the first embodiment, FIG. 5(*a*) being a front view showing the barrier in a closed state, and FIG. 5(*b*) being a side view showing the barrier in the closed state.

FIGS. 25(a) to 25(c) show a barrier device according to a sixth embodiment of the invention, FIG. 25(a) being a front view showing the barrier device in a state of having a barrier at an open position with a fancy cover excluded from the illustration, FIG. 25(b) being a side view showing the barrier device in a state of having the barrier at the open position with a sectional view including the YZ plane showing only the fancy cover and a fore end tube, and FIG. 25(c) being a side view showing the barrier device in a state of having the barrier at a closed position.

DETAILED DESCRIPTION OF THE INVENTION

Hereinafter, preferred embodiments of the invention will be described in detail with reference to the drawings.

(First Embodiment)

The appearance of a camera having a barrier opening-and-closing device according to a first embodiment of the invention is first described.

FIGS. 1(a) to 1(d) show the appearance of the camera having the barrier opening-and-closing device according to the first embodiment in a state of having its lens barrel at a wide-angle end position. The camera permits photo-taking when barrier members 401 and 411 disposed at the fore end of the lens barrel open to expose a lens surface.

Figure 1A:
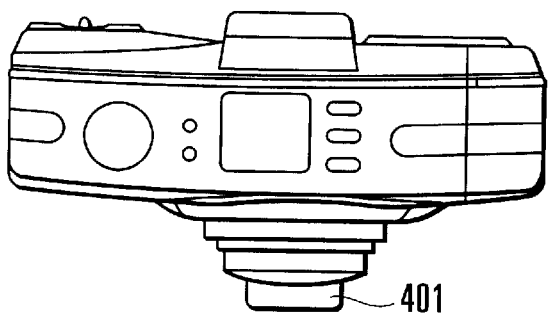
FIGS. 1(*a*) to 1(*d*) show the appearance of a camera having a barrier opening-and-closing device according to a first embodiment of the invention, FIG. 1(*a*) being a top view showing the camera in a state of having its lens barrel at a wide-angle end position, FIG. 1(*b*) being a front view showing the camera in the same state, FIG. 1(*c*) being a side view showing the camera in the same state, and FIG. 1(*d*) being a side view showing the camera in a state of having its lens barrel at a telephoto end position.
Figure 1B:
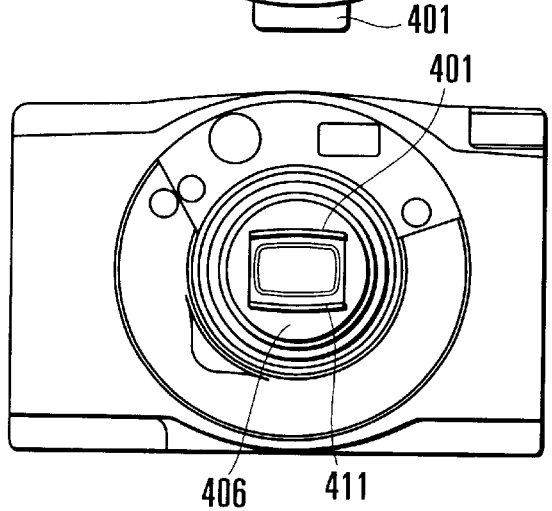
Figure 1C:
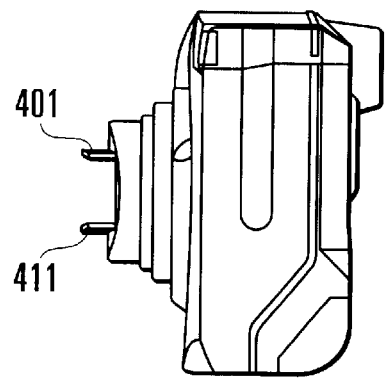
Figure 1D:
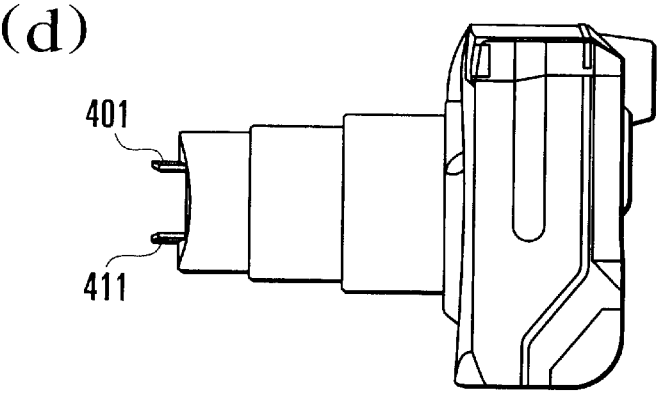
Figure 2A:
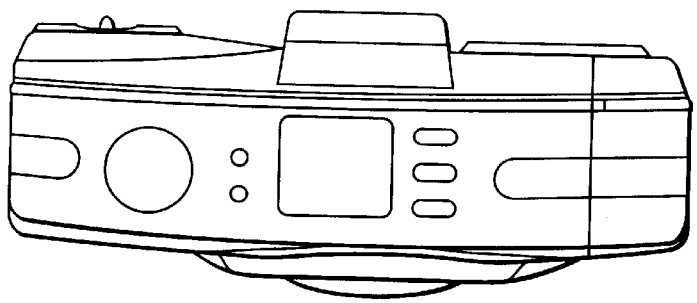
FIGS. 2(*a*) to 2(*c*) show the camera having the barrier opening-and-closing device according to the first embodiment, FIG. 2(*a*) being a top view of the camera in a state of having the lens barrel at a stowed position, FIG. 2(*b*) being a front view of the camera in the same state, and FIG. 2(*c*) being a side view of the camera in the same state.
Figure 2B:
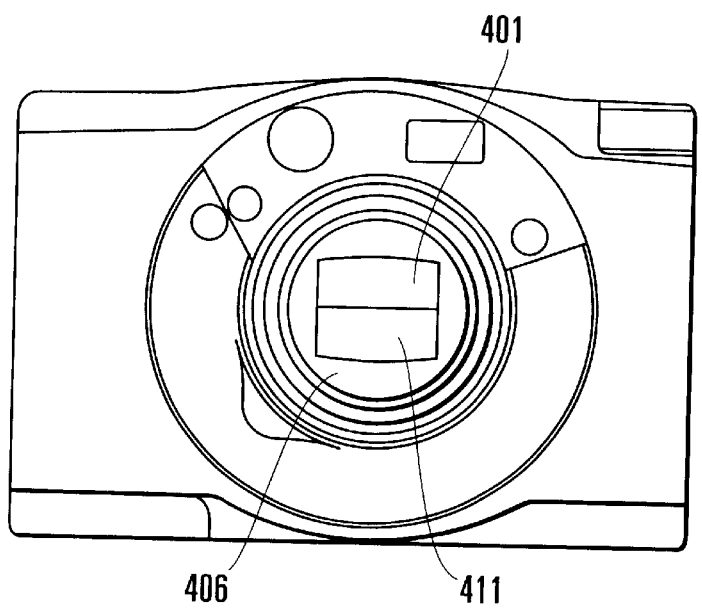
Figure 2C:
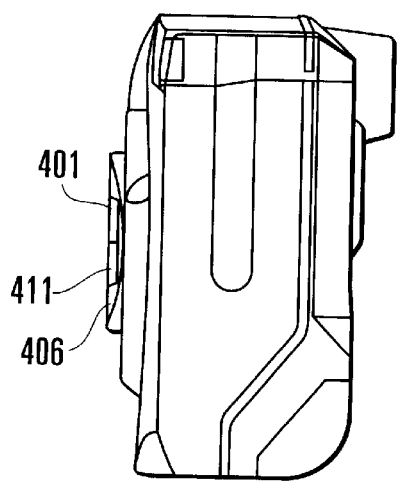
Figure 3A:
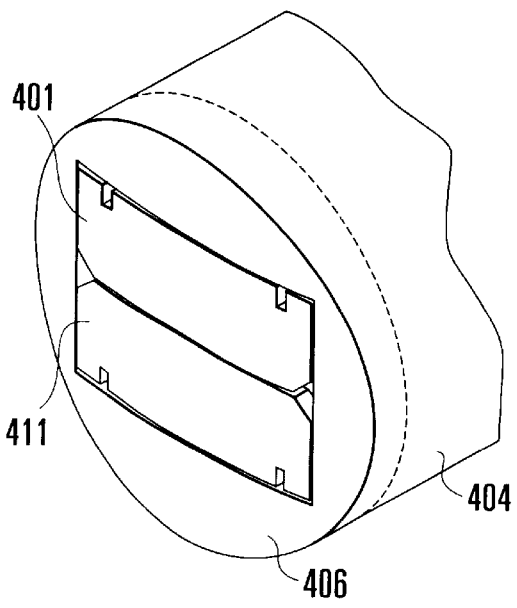
FIGS. 3(*a*) to 3(*d*) are enlarged views showing the fore end of a lens barrel of the camera according to the first embodiment, FIG. 3(*a*) being a perspective view showing a barrier in a closed state, FIG. 3(*b*) being a perspective view showing the barrier in an open state, FIG. 3(*c*) being a front view showing the barrier in the closed state, and FIG. 3(*d*) being a front view showing the barrier in the open state.
Figure 3B:
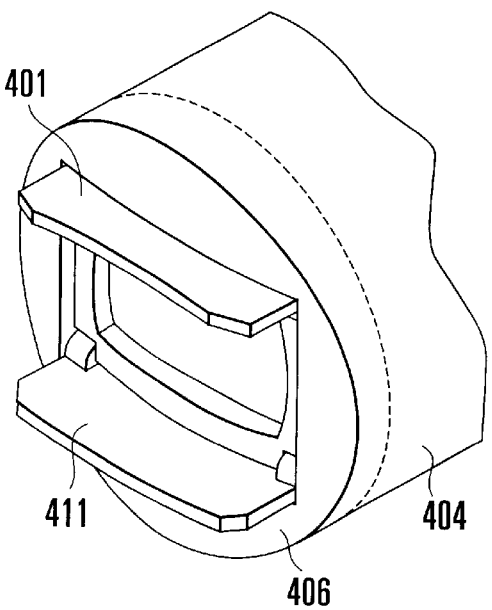
Figure 3C:
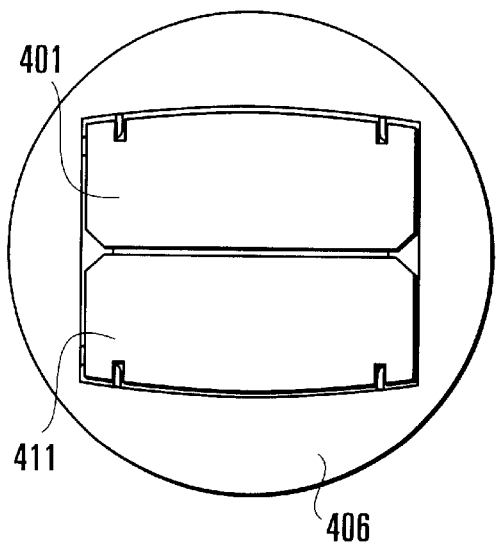
Figure 3D:
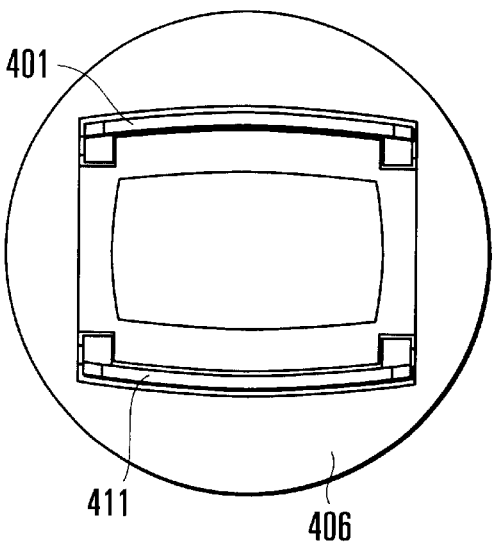

FIGS. 2(a), 2(b) and 2(c) show the camera in a state of having the lens barrel at a stowed position where the barrier members 401 and 411 disposed at the fore end of the lens barrel are closed. With the camera in the state of having the lens barrel at the stowed position, the lens surface is covered with the barrier members 401 and 411. A front face plate 406 is arranged around the barrier members 401 and 411 as an external fancy cover. The external faces of the barrier members 401 and 411 and the front face plate 406 are in cylindrical surface shapes having the same curvature. The upper boundary line between the front face plate 406 and the barrier member 401 has about the same curvature as the external face curvature of the barrier member 401 in a state where the barrier members 401 and 411 are closed. Therefore, even when the barrier members 401 and 411 are in an open state as shown in FIGS. 3(b) and 3(d), no large clearance is brought about at the boundary between the front face plate 406 and the barrier member 401.

Figure 4A:
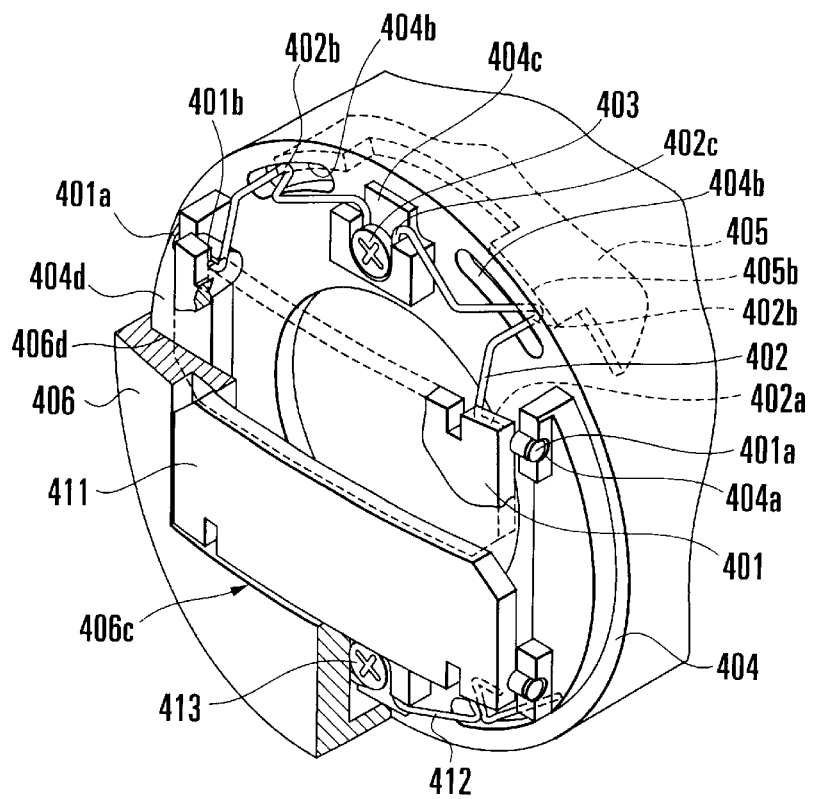
FIGS. 4(*a*) and 4(*b*) are partly-broken enlarged perspective views of the fore end of the lens barrel of the camera according to the first embodiment, FIG. 4(*a*) showing the barrier in a closed state, and FIG. 4(*b*) showing the barrier in an open state.
Figure 4B:
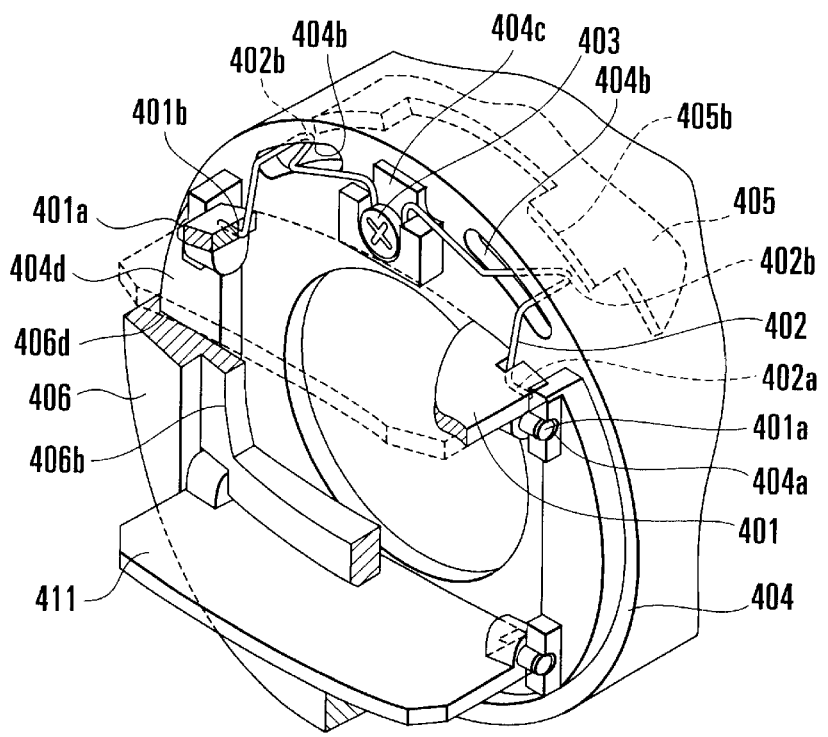

The barrier opening-and-closing device according to the first embodiment is next described. FIGS. 4(a) and 4(b) are perspective views clearly showing a feature of the first embodiment. FIG. 4(a) shows the barrier opening-and-closing device in a state of having the barrier members 401 and 411 at their closed positions.

The barrier member 401 has a curved surface having the curvature of a cylinder and is provided with rotation shaft parts 401a and hole parts 401b at its two ends. The rotation shaft parts 401a are arranged to enable the barrier member 401 to open and close in front of the lens barrel by swinging thereon. The hole parts 401b are arranged to have two ends of a spring 402 fitted therein. An antireflection coating material is applied to the inner surfaces of the barrier member 401.

The spring 402 is composed of fore end parts 402a which are arranged to be fitted into the hole parts 40b of the barrier member 401, projections 402b which are arranged to come into contact with a rectilinear motion tube (to be described later), and a fixing part 402c where the spring 402 is fixed by a screw 403.

A fore end tube 404 is located at the fore end of the lens barrel. The fore end tube 404 is provided with bearing parts 404a where the rotation shaft parts 401a of the barrier member 401 are respectively rotatably secured, a spring receiving part 404c where the spring 402 is secured in place, hole parts 404b where the projections 402b of the spring 402 are allowed to escape, and a bonding face 404d where the front face plate 406 is secured by bonding thereto. The screw 403 secures the spring 402 to the spring receiving part 404c of the fore end tube 404.

Referring to FIGS. 4(a) and 4(b), the front face plate 406, which is shown only at the lower left end part thereof in FIGS. 4(a) and 4(b), is provided with bearing parts 406a (shown in FIG. 5(b)) arranged to rotatably secure thereto the rotation shaft parts 401a of the barrier member 401, a barrel-shaped aperture part 406b arranged to allow a light flux necessary for forming an image to pass there, a hole part 406c arranged to allow the barrier member 401 to escape, and a bonding face 406d at which the front face plate 406 is bonded to the fore end tube 404. The surface of the front face plate 406 is in a cylindrical surface shape, as described in the foregoing.

A rectilinear motion tube 405 is disposed on the inner side of the fore end tube 404. The rectilinear motion tube 405 has projections 405b arranged to push the projections 402b of the spring 402 toward an object to be photographed when the lens barrel is in a stowed state.

Figure 6B:
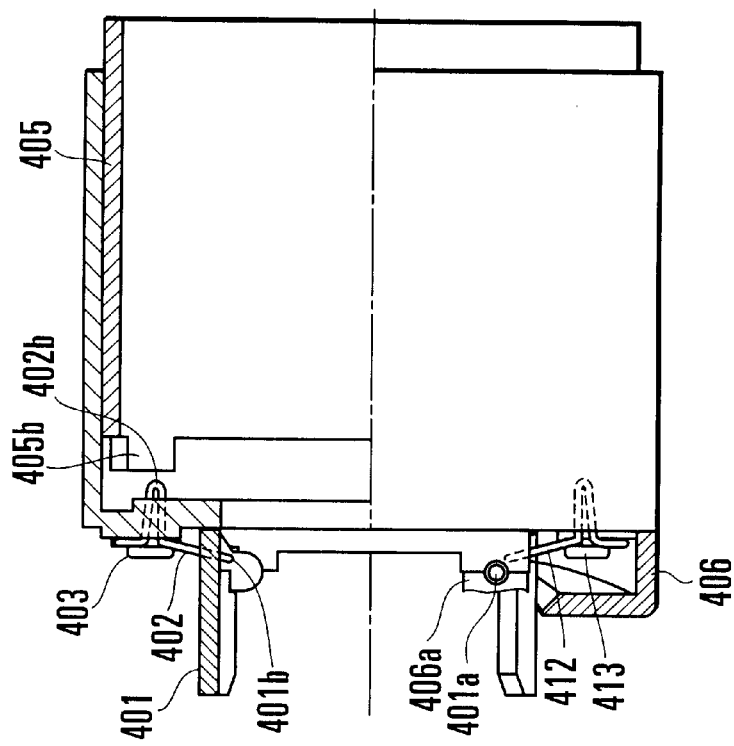
FIGS. 6(*a*) and 6(*b*) are partly-broken enlarged views of the fore end of the lens barrel of the camera according to the first embodiment, FIG. 6(*a*) being a front view showing the barrier in an open state, and FIG. 6(*b*) being a side view showing the barrier in the open state.
Figure 6A:
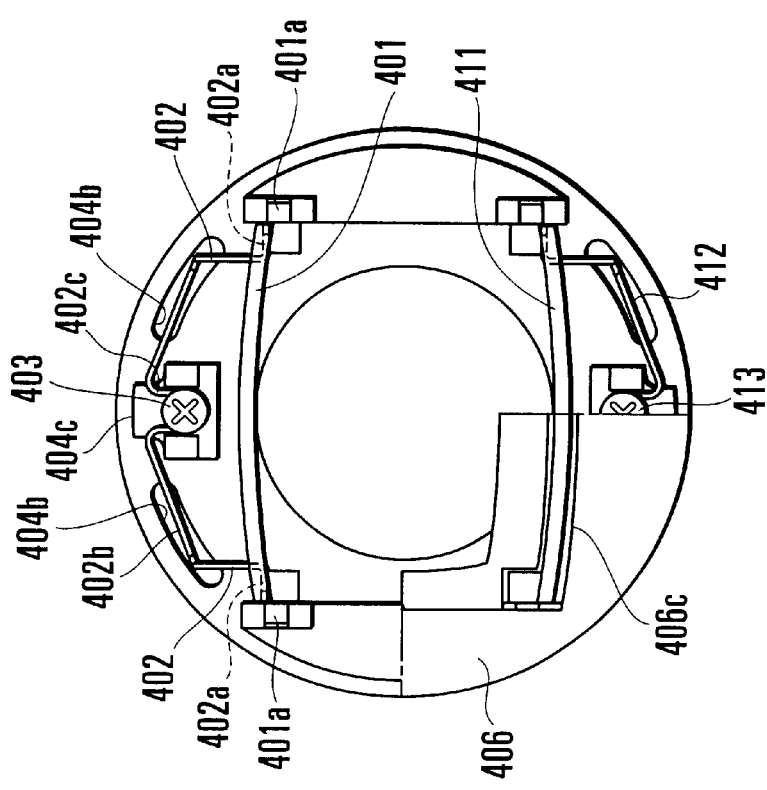

When the lens barrel is at a position between a wide-angle end position and a telephoto end position in a photo-taking state, a shown in FIG. 4(b), the two fore end parts 402a of the spring 402 are trying to flex toward a film which is on an image forming plane, while each of the fitting hole parts 401b for the spring 402 is located on the periphery of each of the rotation shaft parts 401a. Therefore, the barrier member 401 is urged to swing in the direction of opening, as shown in FIG. 6(b). The elastic force of the spring 402 thus urges the barrier member 401 to be always opened upward.

Next, when a switch of the camera is turned off, the state of the lens barrel comes to change into a stowed state. The rectilinear motion tube 405 then approaches the fore end tube 404. The projections 405b of the rectilinear motion tube 405 come to push the projections 402b of the spring 402 toward the front of the fore end tube 404. As a result, the fore end parts 402a of the spring 402 are pushed toward the front of the fore end tube 404.

Since the spring fitting hole parts 401b for the spring 402 are located on the periphery of the rotation shaft parts 401a, the barrier member 401 swings in the direction of closing and the barrier member 401 is thus closed as shown in FIG. 5(b). The barrier members 401 and 411 may be made of an elastic material such as hard rubber.

The above-stated arrangement of the first embodiment gives the following advantages.

Use of a thin wire spring for the urging means requires only a small space for it, so that it contributes to reduction in size and cost of parts.

The antireflection coating applied to the inner surfaces of the barrier members effectively lessens light reflection from the inner surfaces to permit taking a high-quality picture.

Since the barrier members are arranged to have some curvature, the curved barrier members give a larger hood effect in the neighborhood of the upper and lower diagonal parts than flat barrier members.

The boundary lines of the front face plate and the barrier members which are in parallel and near to the rotation shafts of the barrier members have approximately the same curvature as the external surface curvature of the barrier members. Therefore, the gap at the boundary is always small irrespective as to whether the barrier members are open or closed, so that the amount of stray light incident on the inside of the lens barrel coming through the boundary gap can be minimized. As a result, it is possible to reduce leakage of light to a film surface at the time of non-photo-taking or to reduce flare ghost at the time of photo-taking. Further, the arrangement for vertically opening the barrier members enables the upper barrier member to prevent the incident rays of sunlight from above on the fore end lens surface, so that flare ghost can be prevented.

Further, the upper barrier member also serves to prevent raindrops or snowflakes from sticking to the lens surface to degrade the picture quality. The lower barrier member serves to prevent unnecessary incident rays of light from below on the fore end lens surface, such as sunlight reflected by a water surface or the like, so that flare ghost can be prevented. In a case where the barrier members are made of an elastic material such as hard rubber, if the camera accidentally falls on the ground to have the lens barrel first hit the ground, the barrier members first come into contact with the ground. Then, the fall impact is first absorbed by the deformation of the urging means and that of the barrier members taking place when the barrier member close, so that damages of the lens barrel and the camera body can be mitigated.

(Second Embodiment)

FIGS. 7(a) to 7(c) and FIGS. 8(a) to 8(c) show a barrier opening-and-closing device according to a second embodiment of the invention.

Figure 7C:
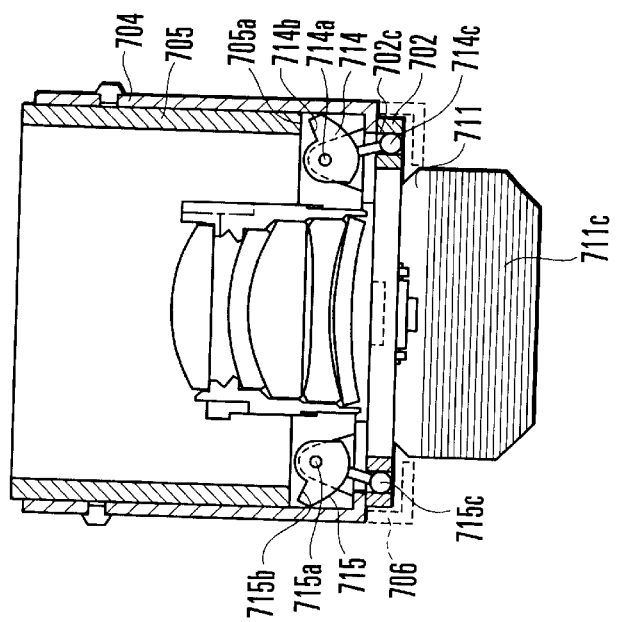
FIGS. 7(*a*) to 7(*c*) are enlarged views of the fore end of a lens barrel of a camera according to a second embodiment of the invention, FIG. 7(*a*) being a front view showing a barrier in an open state, FIG. 7(*b*) being a side view showing the barrier in the open state, and FIG. 7(*c*) being a top view showing the barrier in the open state.
Figure 7B:
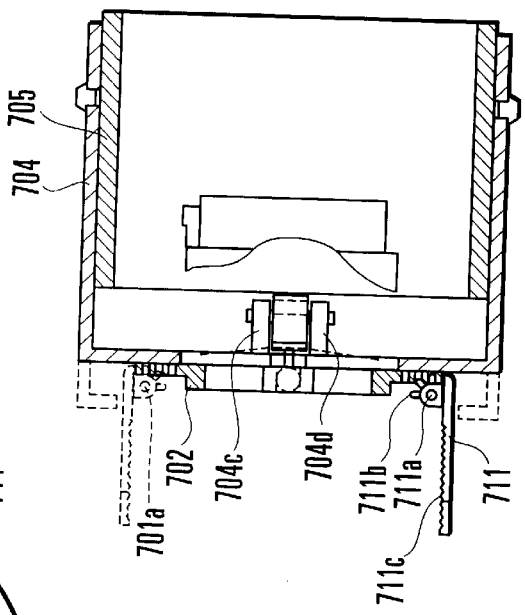
Figure 7A:
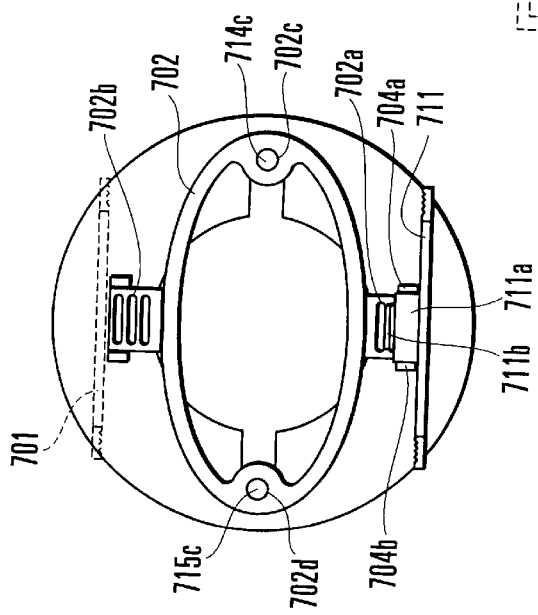

Referring to FIGS. 7(a) to 7(c), a pair of upper and lower barrier members 701 and 711 are arranged alike to be openable and closable in front of a lens barrel. The barrier member 711 is shown in a full line and the other barrier member 701 is shown in a dotted line. Since the barrier members 701 and 711 are arranged alike, the following description covers only the barrier member 711.

The barrier member 711 has a flat barrier face part and is arranged to open and close vertically in a pair with the barrier member 701 in front of the lens barrel by swinging on a rotation shaft part 711a which is disposed at the center of a root of the barrier member 711. The rotation shaft part 711a has a gear part 711b formed on its periphery to be in mesh with a rack part 702a of a spring 702 (to be described later). Light-blocking lines 711c are carved in the inner face of the barrier member 711 for the purpose of preventing reflection.

The spring 702 is made of an elastic material in its entirety and is approximately in an elliptic shape as viewed from on the front side. The spring 702 has a pair of upper and lower rack parts 702a and 702b formed along the minor axis of the elliptic shape and arranged to open and close the barrier member 711 in mesh with the gear part 711b of the barrier member 711. The spring 702 further has a pair of right and left hole parts 702c and 702d which are arranged along the major axis of the elliptic shape to have ball parts 714c and 715c of links 714 and 715 fitted therein.

A fore end tube 704 is located at the fore end of the lens barrel. The fore end tube 704 has bearing parts 704a and 704b to which the rotation shaft part 711a of the barrier member 711 is secured in a ratable manner, and also has holding parts 704c and 704d which are arranged to rotatably hold the links 714 and 715.

The link 714 has a rotation center 714a arranged to be rotatably held by the holding parts 704c and 704d of the fore end tube 704, the ball part 714c which is fitted in the hole part 702c of the spring 702, and a contact part 714b which is arranged to be pushed by the fore end 705a of a rectilinear motion tube 705 (to be described later). The other link 715 is also arranged in the same manner as the link 714.

The rectilinear motion tube 705 has the fore end 705a which is arranged to come into contact with the contact parts 714b and 715b of the links 714 and 715.

Next, the operation of the barrier opening-and-closing device according to the second embodiment to bring the barrier member 711 from an open state into a closed state is described with reference to FIGS. 7(a) to 7(c) and FIGS. 8(a) to 8(c).

Figure 8C:
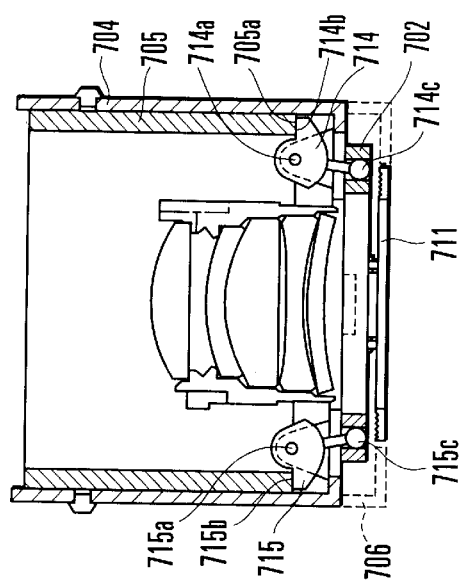
FIGS. 8(*a*) to 8(*c*) are enlarged views of the fore end of the lens barrel of the camera according to the second embodiment, FIG. 8(*a*) being a front view showing the barrier in a closed state, FIG. 8(*b*) being a side view showing the barrier in the closed state, and FIG. 8(*c*) being a top view showing the barrier in the closed state.
Figure 8B:
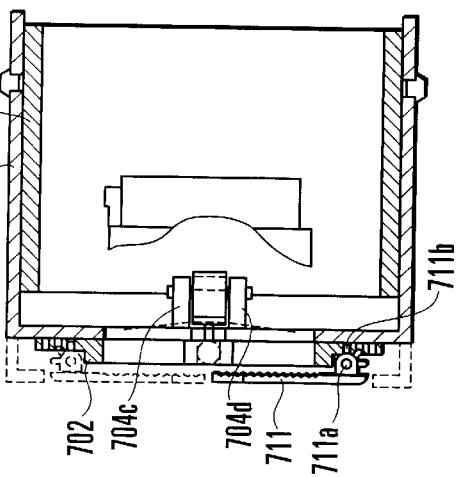
Figure 8A:
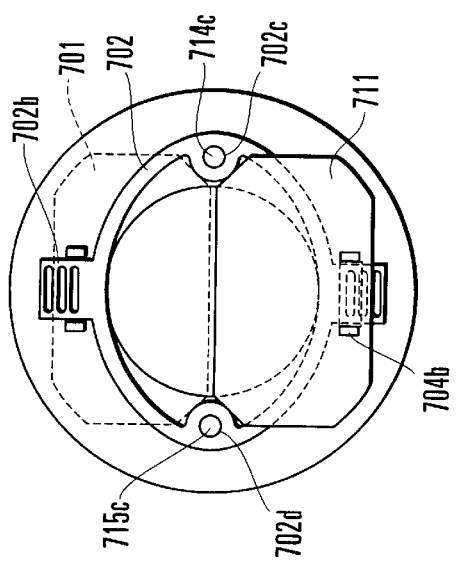

When a switch of the camera is turned off, the rectilinear motion tube 705 approaches the fore end tube 704 as shown in FIG. 8(c). The fore end 705a of the rectilinear motion tube 705 then pushes the contact parts 714b and 715b of the links 714 and 715.

The thus-pushed links 714 and 715 rotate on their centers of rotation 714a and 715a. The ball parts 714c and 715c then come closer to an optical axis. The holes 702c and 702d of the spring 702 in which the ball parts 714c and 715c of the links 714 and 715 are fitted also come close to the optical axis. Therefore, the right and left parts of the spring 702 are compressed along the major axis of the elliptic shape. This causes the spring 702 to vertically expand along the minor axis of the elliptic shape thereof.

As a result, the rack part 702a which is located on the lower side of the spring 702 moves downward to cause the gear part 711b of the barrier member 711 which is in mesh with the rack part 702a to rotate. The rotation of the gear part 711b causes the barrier member 711 to close. The other barrier member 701 also comes to close in the same manner.

When the switch of the camera is turned on, the rectilinear motion tube 705 comes to part from the fore end tube 704 as shown in FIG. 7(c). Then, the contact parts 714b and 715b, which have been pushed by the fore end 705a of the rectilinear motion tube 705, are freed.

At this time, the spring 702 tries to resume its original free shape shown in FIG. 7(a). This causes the hole parts 702c and 702d to horizontally spread to bring the links 714 and 715 back to their positions shown in FIG. 7(c).

The spring 702 then becomes vertically narrower in the direction of the minor axis of the elliptic shape to cause the rack part 702a of the spring 702 to move upward. The upward movement of the rack part 702a causes the gear part 711b of the barrier member 711 which is in mesh with the rack part 702a to rotate. The rotation of the gear part 711b causes the barrier member 711 to open. The other barrier member 701, which is indicated with a dotted line, also comes to open in the same manner.

The advantages of the second embodiment described above lie in the following points.

The upper and lower barrier members 711 and 701 are arranged to be under the urging force of one spring to move in the direction of opening the barrier. The arrangement permits reduction in number of parts.

The elasticity of the spring prevents the barrier opening-and-closing device from being damaged, by absorbing an external force even when the external force happens to be applied to the barrier opening-and-closing device in the direction of closing the barrier.

The light-blocking (or flare-blocking) lines provided on the inner surfaces of the barrier members effectively lessen reflection by the inner surfaces, so that pictures can be taken with a high picture quality.

(Third Embodiment)

FIGS. 9 to 11 and FIG. 15 relate to a third embodiment of the invention.

Figure 11:
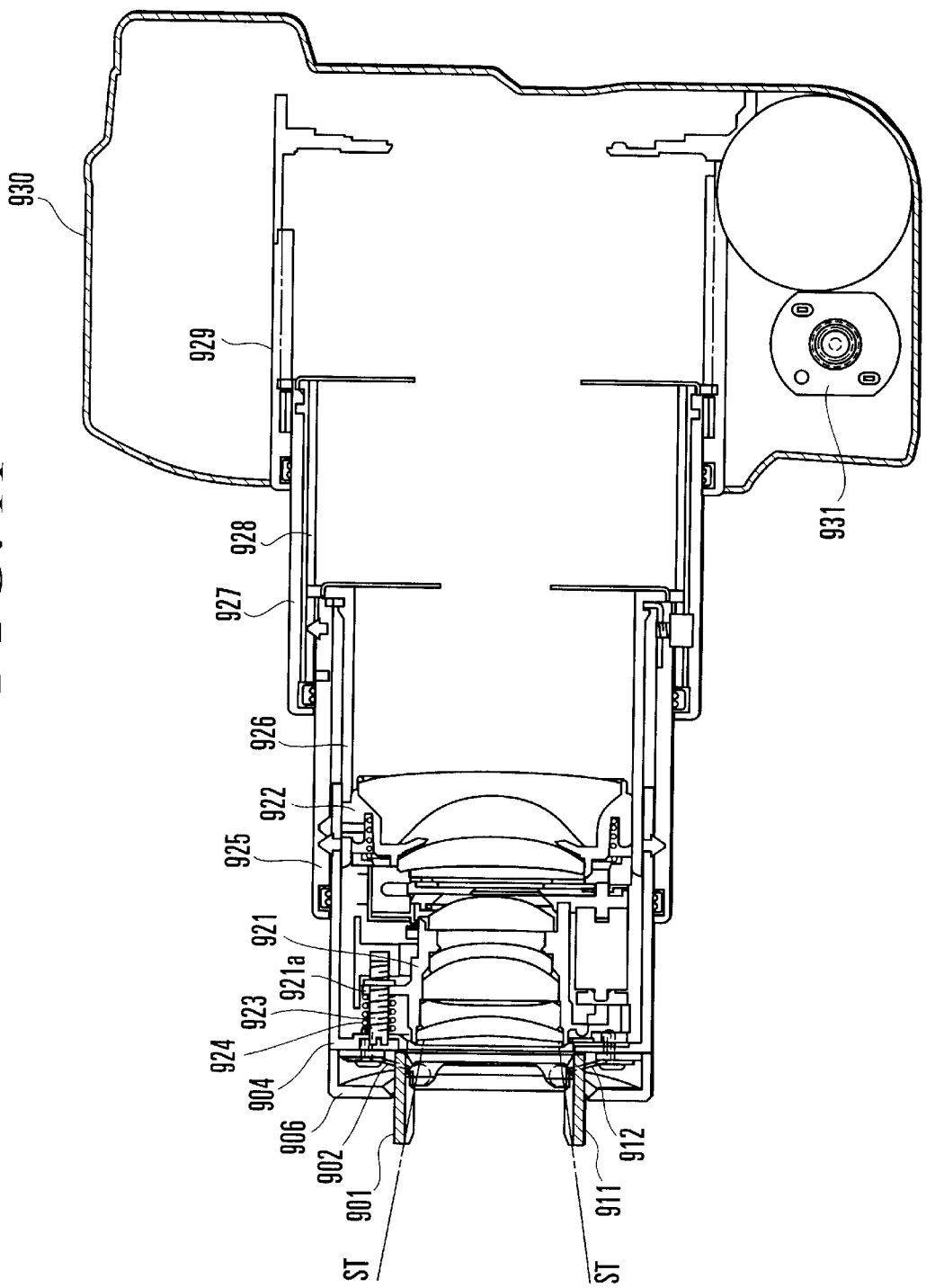
FIG. 11 is a vertical sectional side view showing the camera according to the third embodiment in a state of having the lens barrel at a telephoto end position.

Referring to FIG. 11, the structural arrangement of a camera according to the third embodiment is described as follows. A lens barrel of the camera is a three-step lens barrel including a two-group zoom lens arranged to be drawn out by means of a zoom motor for zooming. As for focusing, a first lens group is arranged to be drawn out for focusing by means of a focus motor (not shown) disposed within a fore end tube 904.

The fore end tube 904 is located at the fore end. of the three-step lens barrel which is arranged to be drawn out by means of a cam-and-pin arrangement.

A fixed tube 929 is secured to a camera body 930. A third tube 927 which is arranged to be rotatively drawn out by the zoom motor fittingly engages the inner surface of the fixed tube 929. A third rectilinear motion tube 928 fittingly engages the inner surface of the third tube 927 and is arranged to be drawn out in a nonrotating manner together with the third tube 927.

A second tube 925 is arranged on the front side of the third tube 927 to be rotatively drawn out with respect to the third tube 927. A rectilinear motion tube 926 is arranged on the inner side of the second tube 925 to be drawn out in a nonrotating manner together with the second tube 925.

The fore end tube 904 is arranged at the fore end of the second tube 925 to be drawn out in a nonrotating manner. The barrier opening-and-closing device which is described above in the description of the first embodiment is disposed in front of the fore end tube 904.

Figure 15:
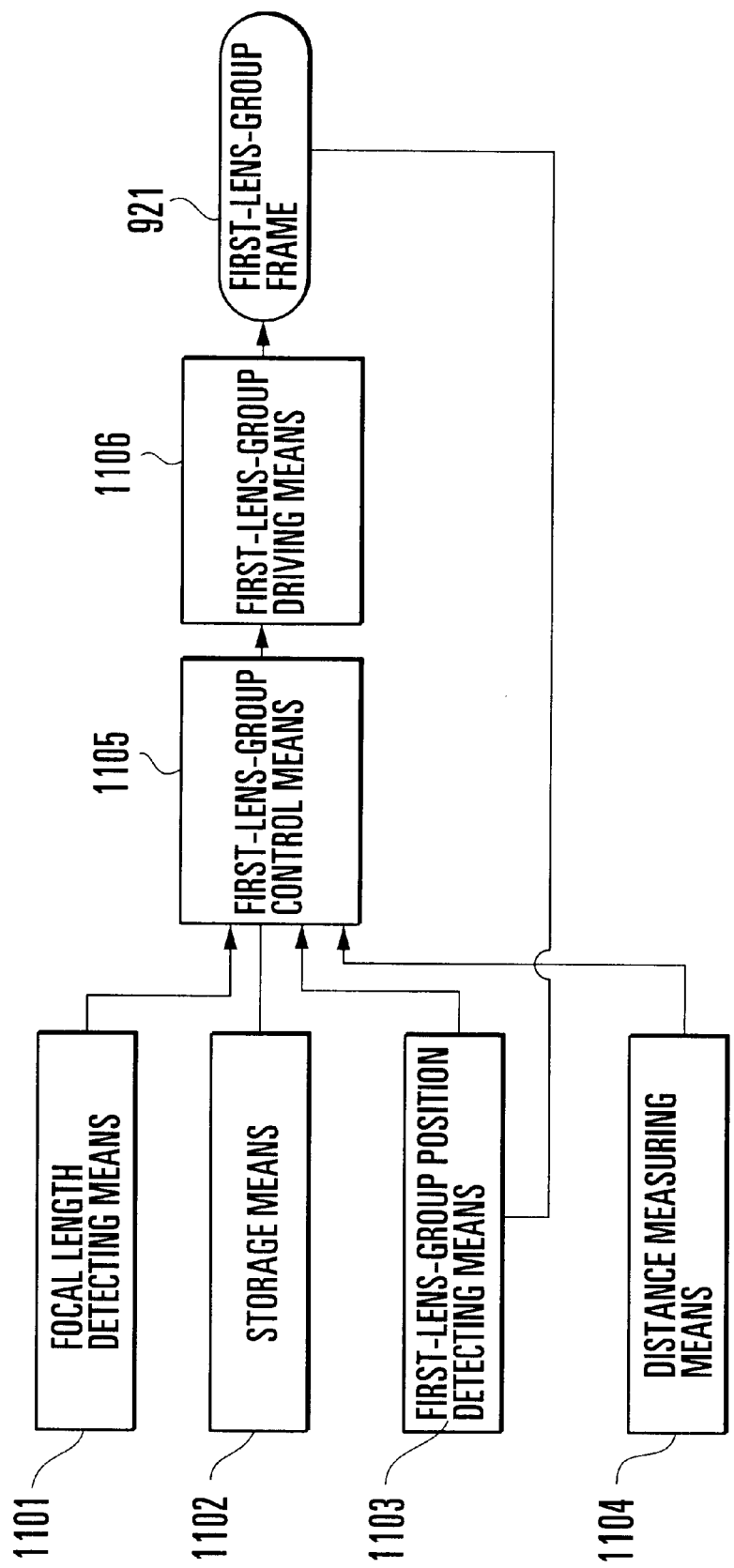
FIG. 15 is a block diagram of a control arrangement of the camera according to the third embodiment of the invention in respect to focusing and zooming actions of the camera.

The operation of the camera according to the third embodiment which is arranged as described above is next described below with reference to FIG. 15, which is a block diagram.

Figure 9:
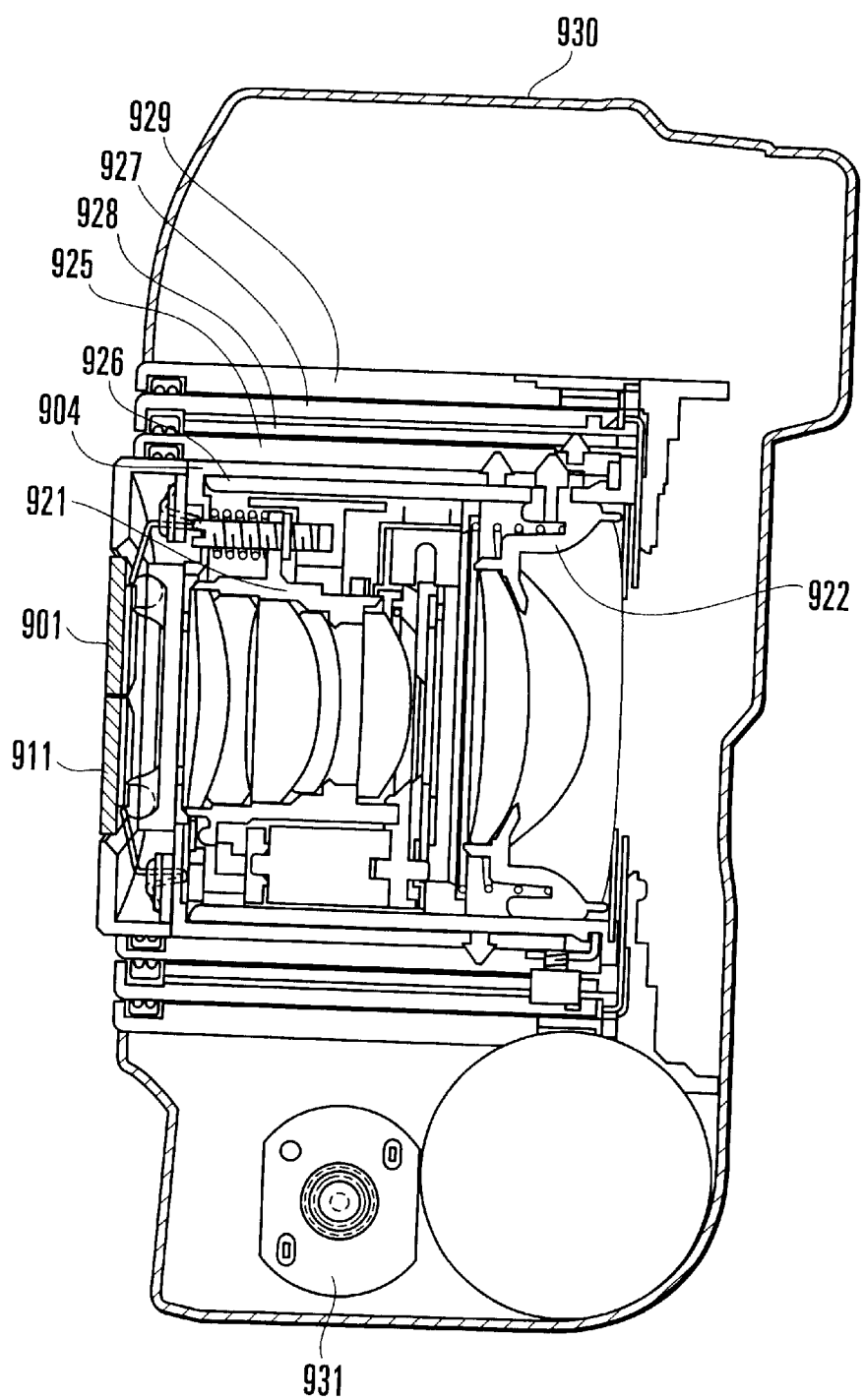
FIG. 9 is a vertical sectional side view showing a camera according to a third embodiment of the invention in a state of having a lens barrel at a stowed position.

When the lens barrel is in its stowed state, as shown in FIG. 9, with the switch of the camera in its off-state, the barrier opening-and-closing device is closed by the pressure of the rectilinear motion tube 926. Now, when the switch of the camera is turned on, the zoom motor 931 rotates to cause the position of the lens barrel to change to a wide-angle end position. The rectilinear motion tube 926 relatively moves away from the fore end tube 904. Then, the barrier opening-and-closing device is opened by the restoration of the shapes of upper and lower springs 902 and 912.

The rotation of the zoom motor 931 also causes a second-lens-group frame 922 to come to a wide-angle end position optically designed. Meanwhile, a first-lens-group frame 921 is moved to an incompletely drawn-out position which is located away from the optical design position on the side of a film surface.

At this time, a focal length detecting means 1101 detects that the lens barrel is at the wide-angle end position. A storage means 1102 then informs a first-lens-group control means 1105 of an amount of deficiency of drawing out the first-lens-group frame 921 for the wide-angle end position.

Under this condition, when a shutter release is made for taking a picture, information on a distance to an object of shooting measured by a distance measuring means 1104 is sent to the first-lens-group control means 1105. A first-lens-group position detecting means 1103 detects the current position of the first-lens-group frame 921 within the fore end tube 904 and sends the information to the first-lens-group control means 1105.

The first-lens-group control means 1105 then computes and obtains an amount of drawing out the first-lens-group frame 921 for focusing, on the basis of the current position of the first lens group, the deficiency amount for drawing out the first-lens-group frame 921 and the information on the object distance.

The computed amount of drawing out the first-lens-group frame 921 is transmitted to a first-lens-group driving means 1106. The first-lens-group driving means 1106 then draws out the first-lens-group frame 921.

Then, the film surface is exposed to light, and the film is wound up. The first-lens-group driving means 1106 brings the first-lens-group frame 921 back to its initial position.

Figure 10:
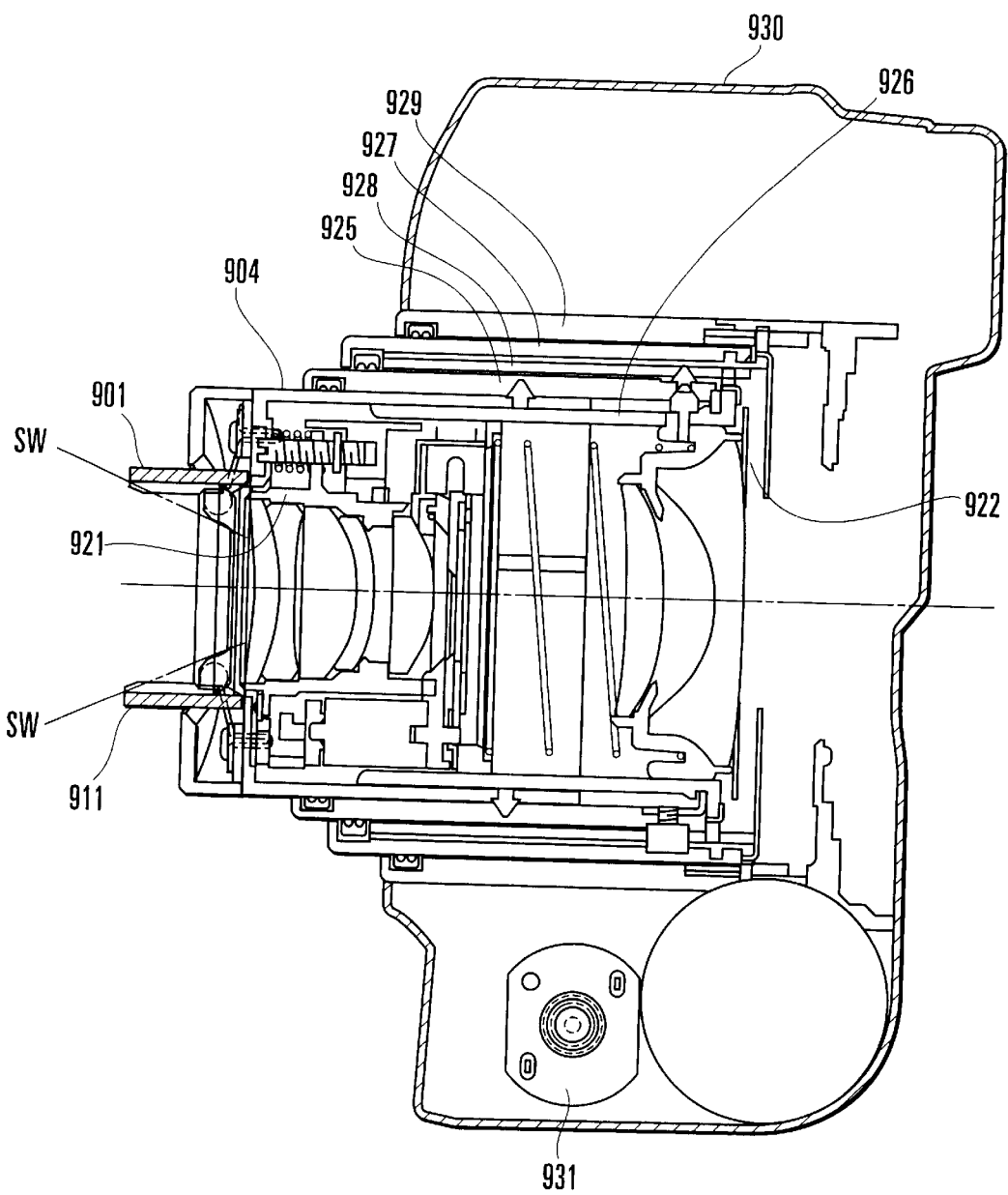
FIG. 10 is a vertical sectional side view showing the camera according to the third embodiment in a state of having the lens barrel at a wide-angle end position.

FIG. 10 shows the lens barrel in its infinity distance shooting state obtained at the wide-angle end position. In this state, the first-lens-group frame 921 is drawn out on the side of the object with respect to the barrier opening-and-closing device. Therefore, an edge SW of incident light forming an image is allowed to pass very near the fore ends of the barrier members 901 and 911 but without being eclipsed by the fore ends of the barrier members 901 and 911.

Next, when the lens barrel is operated for zooming to a telephoto end position, the position of the lens barrel is changed by the rotation of the zoom motor 931 from the position shown in FIG. 10 to the telephoto end position as shown in FIG. 11. The first-lens-group frame 921 and the second-lens-group frame 922 are moved for zooming to their optically designed telephoto end positions.

The position of the first-lens-group frame 921 relative to the barrier opening-and-closing device is drawn in further toward the film surface when the lens barrel is at the telephoto end position than when the lens barrel is at the wide-angle end position. An edge ST of incident light, therefore, passes nearby the fore ends of the barrier members 901 and 911 when the lens barrel is at the telephoto end position.

The third embodiment arranged as described above has the following advantages.

The position of the first lens group relative to the barrier members is drawn out toward the object when the lens barrel is at the wide-angle end position and drawn in toward the film surface when the lens barrel is at the telephoto end position. Further, an effective length, as a hood, from the fore ends of the barrier members to the first lens surface of the lens barrel is arranged to be shorter to prevent an effective image-forming incident light flux from being eclipsed by the fore ends of the barrier members when the lens barrel is at the wide-angle end. The effective length as a hood is arranged to be longer to cut a larger amount of harmful rays included in the image-forming incident light flux for taking a high-quality picture when the lens barrel is at the telephoto end position.

The barrier members are arranged to be driven for only two purposes of opening and closing them. That arrangement, therefore, permits simplification of the barrier opening-and-closing mechanism and reduction in size of the barrier opening-and-closing device.

(Fourth Embodiment)

Figure 12:
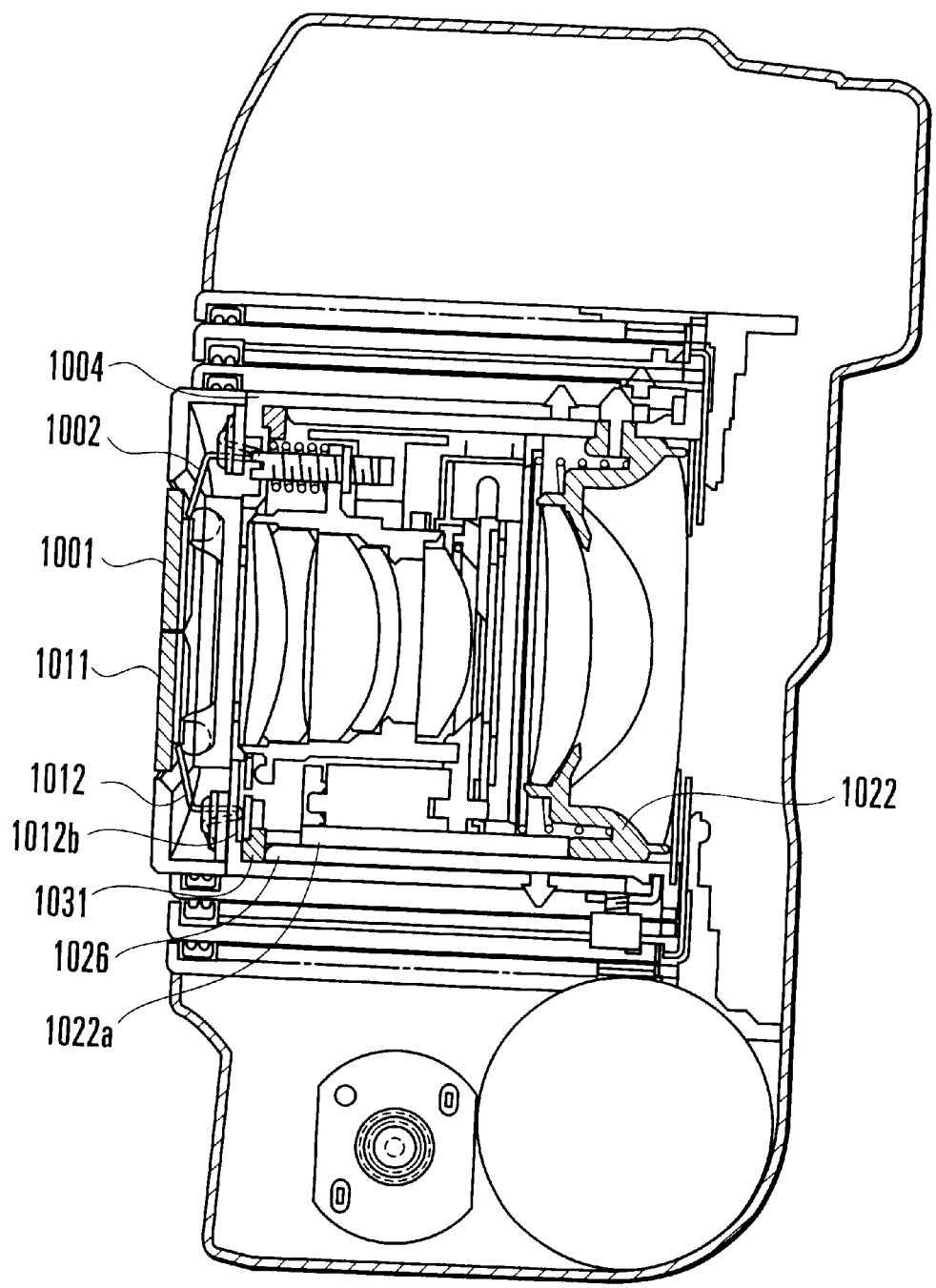
FIG. 12 is a vertical sectional side view showing a camera according to a fourth embodiment of the invention in a state of having a lens barrel at a stowed position.
Figure 13:
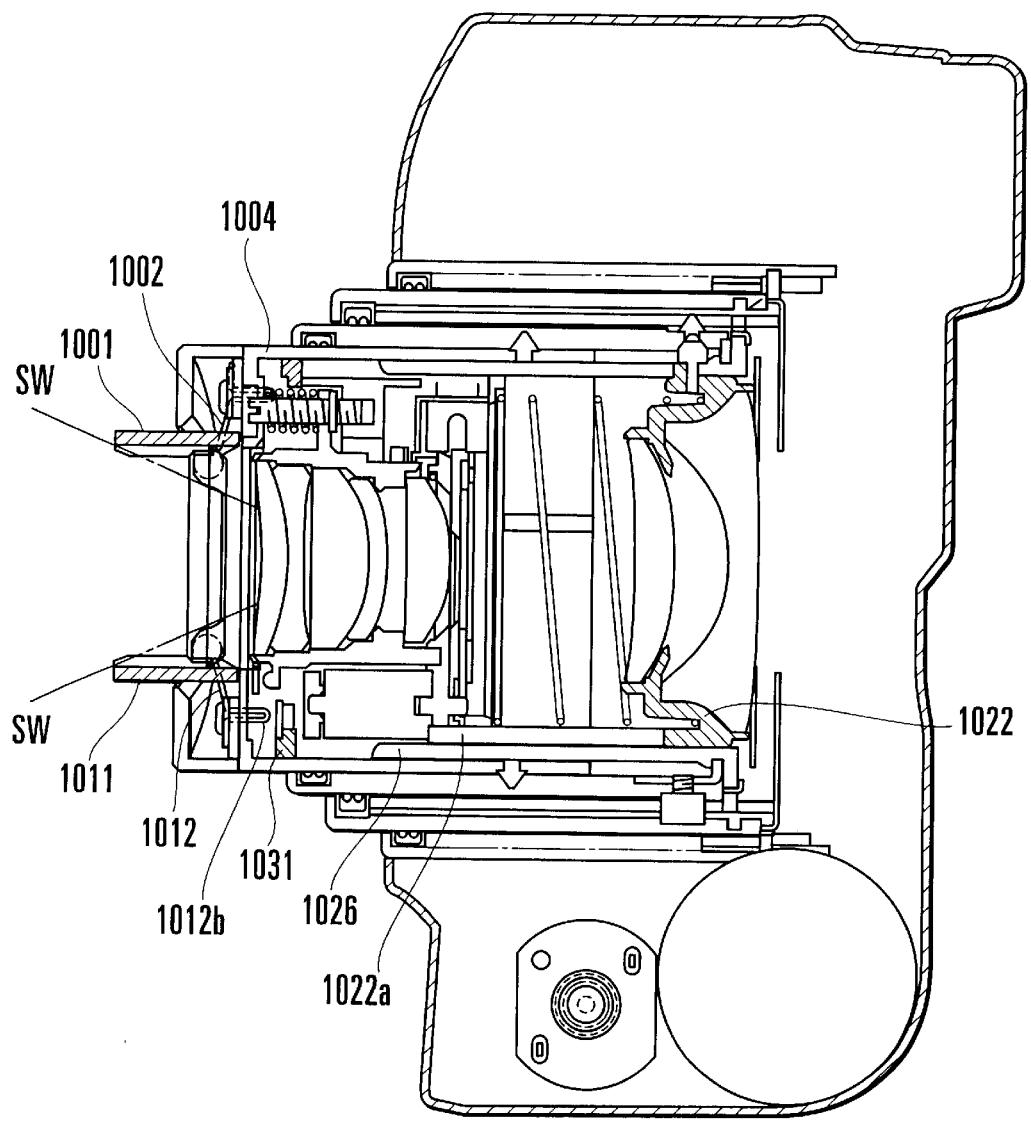
FIG. 13 is a vertical sectional side view showing the camera according to the fourth embodiment in a state of having the lens barrel at a wide-angle end position.
Figure 14:
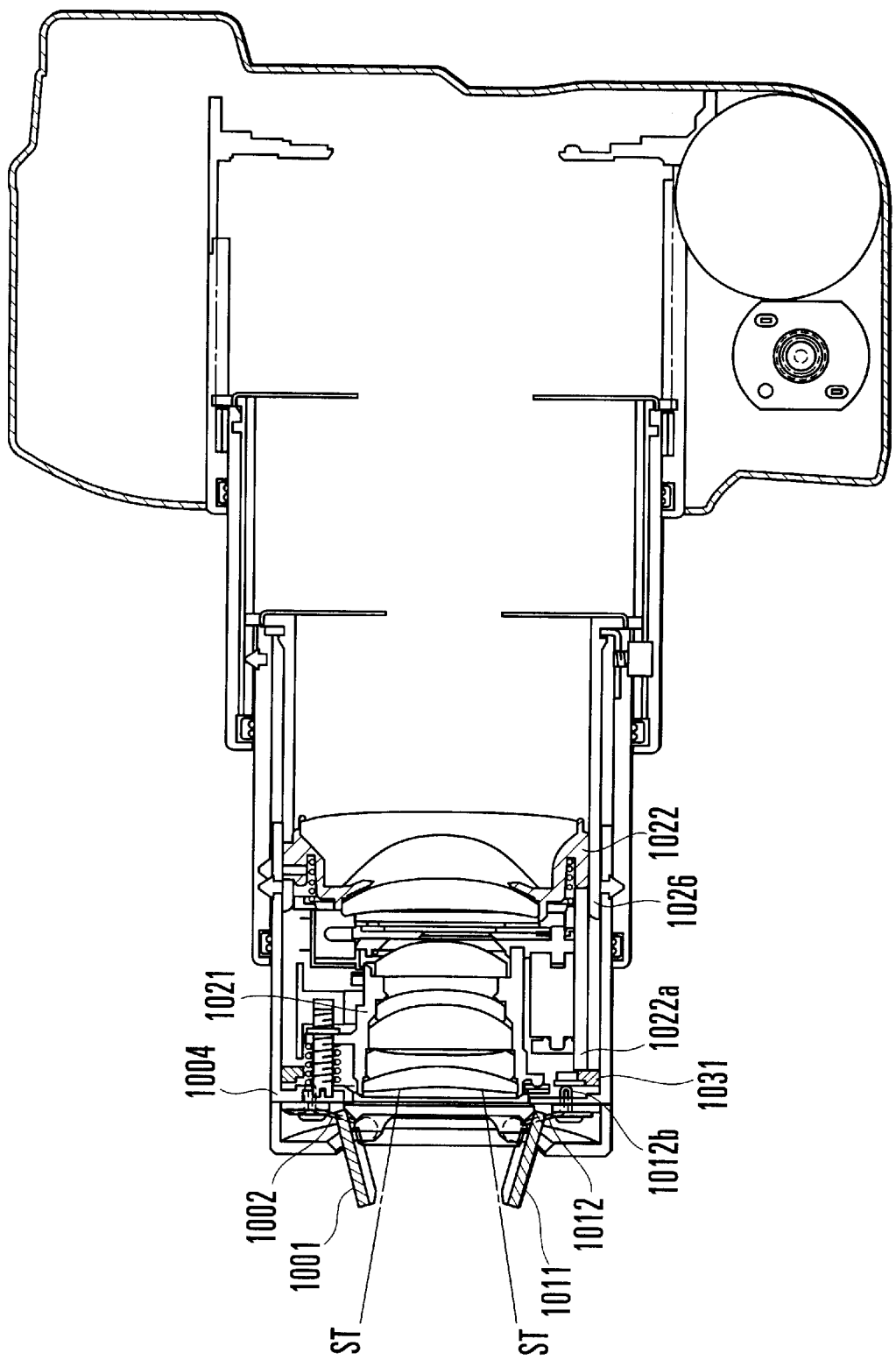
FIG. 14 is a vertical sectional side view showing the camera according to the fourth embodiment in a state of having the lens barrel at a telephoto end position.

FIGS. 12, 13 and 14 show a camera according to a fourth embodiment of the invention. The camera according to the fourth embodiment has a lens barrel, which is a three-step lens barrel including a two-group zoom lens arranged to alternately perform zooming and focusing actions with one and the same motor.

The barrier opening-and-closing device in the fourth embodiment is arranged in about the same manner as that of the first embodiment. The following description, therefore, covers only a different point of the fourth embodiment from the first embodiment.

A ring member 1031 is slide-fitted to the front inner side of a fore end tube 1004 and is arranged to be pushed forward by a rectilinear motion tube 1026 and a projection 1022a of a second-lens-group frame 1022.

The second-lens-group frame 1022 has the above-stated projection 1022a arranged on its periphery to push the ring member 1031.

In zooming the lens barrel from a stowed position to a wide-angle end position and then to a telephoto end position, the camera operates as described below.

When the lens barrel is in a stowed state as shown in FIG. 12 with a switch of the camera in an off-state, the rectilinear motion tube 1026 is pushing the ring member 1031 toward the object of shooting. The ring member 1031 is in turn pushing a projection 1012b of a spring 1012 toward the object. A barrier member 1011 is thus caused to be at its closed position while another barrier member 1001 is also at its closed position under this condition.

When the switch of the camera is turned on, the lens barrel comes to take a wide-angle end position as shown in FIG. 13. The rectilinear motion tube 1026 then moves rearward relative to the fore end tube 1004 to allow the spring 1012 which has been deformed to resume its original shape. Then, the projection 1012b of the spring 1012 pushes the ring member 1031 toward a film surface. After that, the ring member 1031 comes to a stop at a position where the ring member 1031 receives no pressure from other parts.

The recovery of the spring 1012 to its original shape causes the barrier members 1011 and 1001 to open to a full extent.

With the barrier members 1011 and 1001 fully opened, their fore ends allow the edge SW of an image-forming incident light flux to pass nearby there without being eclipsed.

When the position of the lens barrel is shifted by a zooming operation to a telephoto end position as shown in FIG. 14, the second-lens-group frame 1022 comes closest to a first-lens-group frame 1021. Then, the projection 1022a of the second-lens-group frame 1022 pushes the ring member 1031 toward the object.

The projection 1012b of the spring 1012 is pushed to move toward the object by the pressure of the ring member 1031. The amount of this movement is smaller than the amount of movement of the ring member 1031 caused by the pushing pressure of the rectilinear motion tube 1004. The barrier members 1011 and 1001, therefore, come to a stop at a half-open position.

With the barrier members 1011 and 1001 at the half open positions, the edge part ST of image-forming incident light passes nearby the fore ends of the barrier members 1011 and 1001.

After that, when the lens barrel is reversely zoomed from the telephoto end position toward the wide-angle end position, the projection 1022a of the second-lens-group frame 1022 moves relative to the ring member 1031 toward the film surface to free the ring member 1031 from pressure. Then, the righting moment of the spring 1012 causes the ring member 1031 to be pushed and moved by the projection 1012b of the spring 1012 toward the film surface. The barrier members 1011 and 1001 are then fully opened by the righting moment of the spring 1012. The image forming incident light is thus never eclipsed by the barrier members 1011 and 1001.

The fourth embodiment arranged as described above has the following advantages.

The barrier members of the barrier opening-and-closing device are arranged to fully open when the lens barrel is between the wide-angle end position and an intermediate focal length position. This prevents the effective image forming light from being eclipsed by a hood part. The barrier members are arranged to be half opened when the position of the lens barrel is in the neighborhood of the telephoto end position. That permits cutting harmful rays of light in a larger amount to ensure taking a high-quality picture.

Further, since the opening angle of the barrier member is mechanically controlled within the lens barrel, an electrical control circuit disposed within the camera can be operated without any load of control over the opening angle, so that the arrangement of electrical control can be simplified.

(Fifth Embodiment)

A barrier opening-and-closing device of a lens barrel according to a fifth embodiment of the invention is described below with reference to FIGS. 16 to 24.

Figure 16:
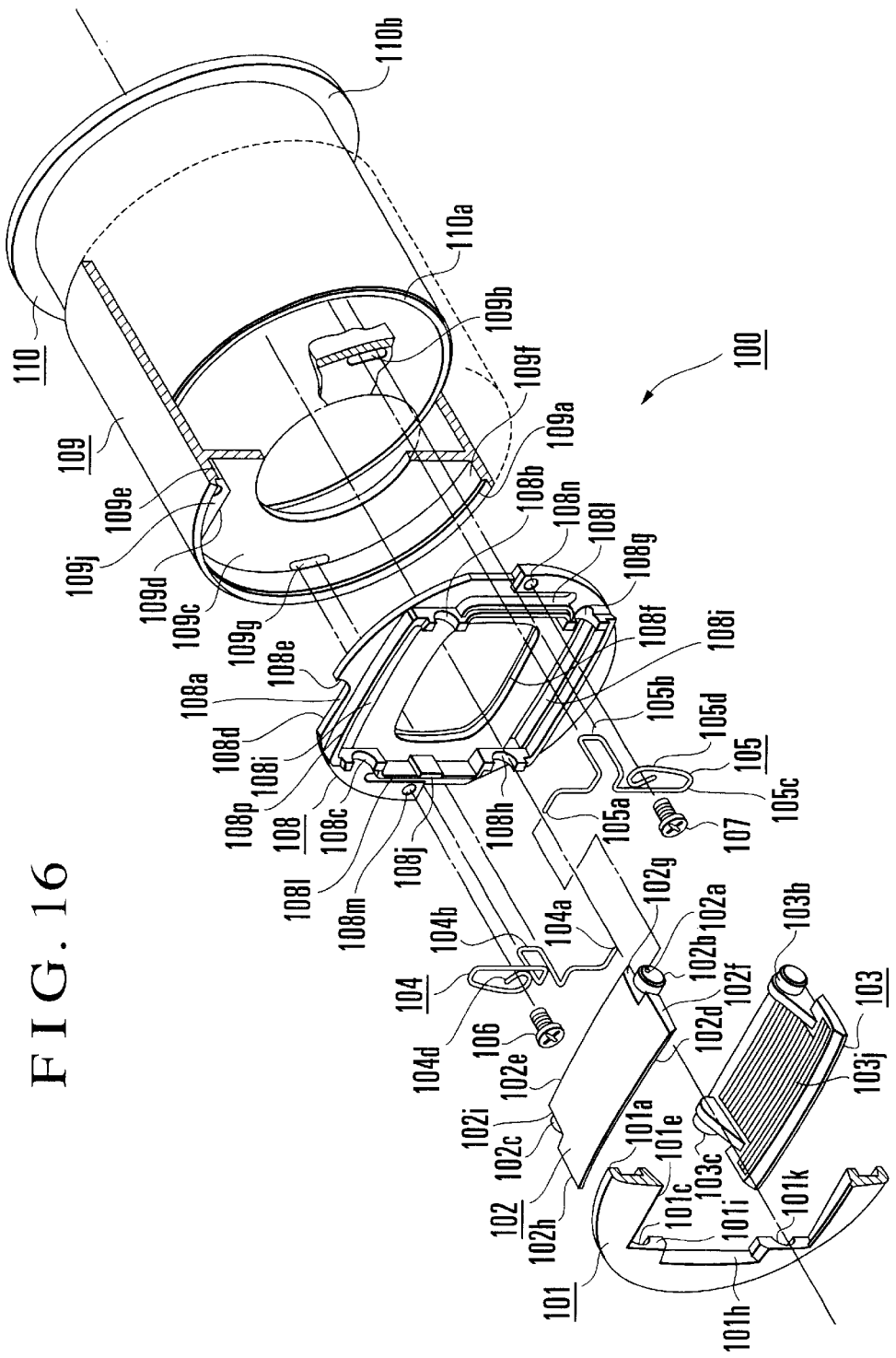
FIG. 16 is an exploded perspective view of a lens barrel of a camera having a barrier device according to a fifth embodiment of the invention.
Figure 23:
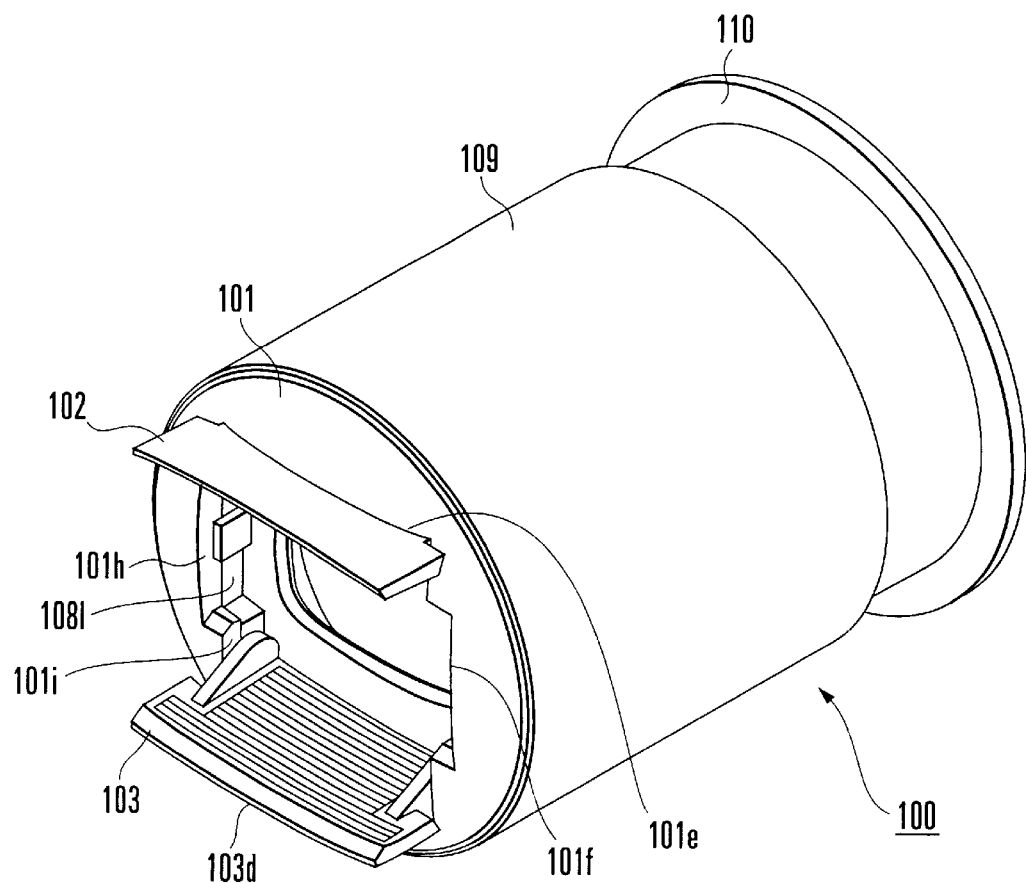
FIG. 23 is a perspective view showing the appearance of the lens barrel of the camera according to the fifth embodiment in a state of having the barrier at an open position.
Figure 24:
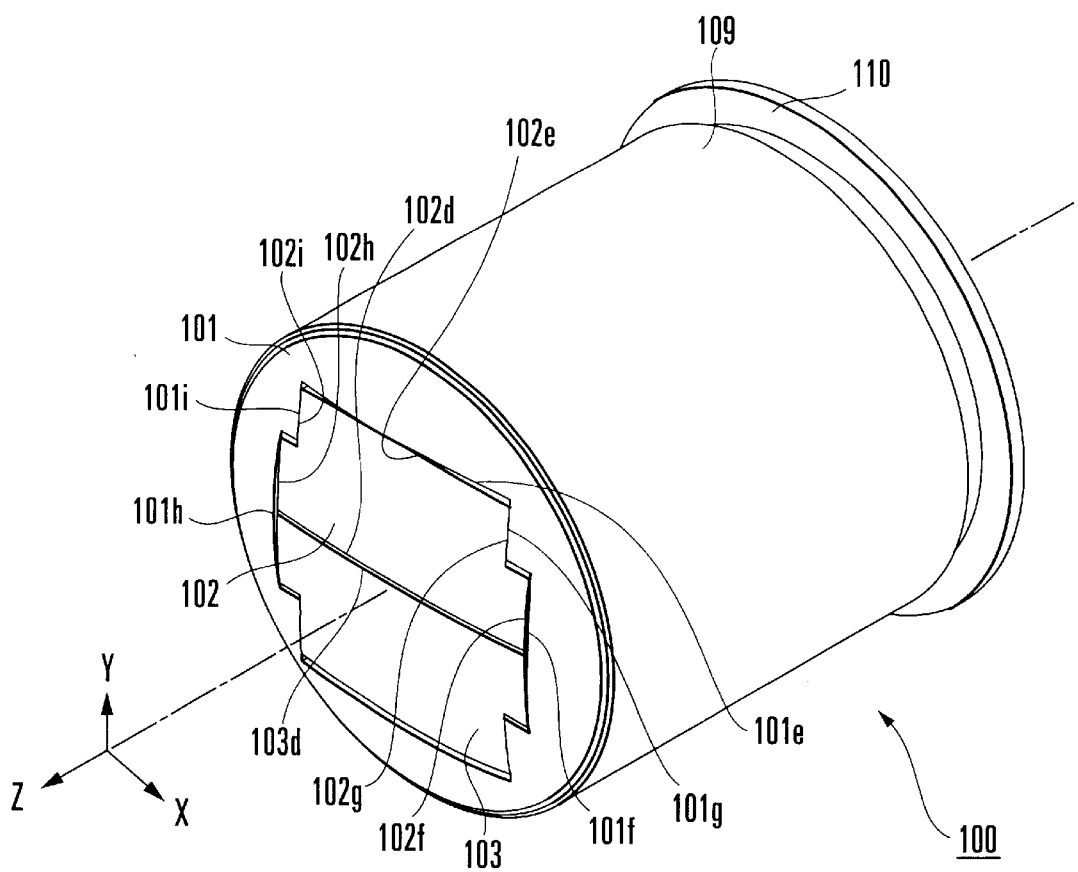
FIG. 24 is a perspective view showing the appearance of the lens barrel of the camera according to the fifth embodiment in a state of having the barrier at a closed position.

FIG. 16 is an exploded perspective view of the lens barrel 100 having the barrier opening-and-closing device according to the fifth embodiment. The feature of the fifth embodiment is best shown in FIG. 16. The appearance of the lens barrel 100 is shown in FIGS. 23 and 24.

As shown in FIG. 16, the lens barrel 100 according to the fifth embodiment has a rectilinear motion tube 110, a fore end tube 109, a base seat 108, a fancy cover 101, a pair of upper and lower barrier members 102 and 103, springs 104 and 105 arranged to urge the barrier members 102 and 103, and screws 106 and 107 arranged to secure the springs 104 and 105 to the base seat 108.

The rectilinear motion tube 110 of the lens barrel 100 has an optical lens disposed therein as a photo-taking lens. A flange part 110 formed on the base end side of the rectilinear motion tube 110 is arranged to be used in mounting the lens barrel on a camera body. The rectilinear motion tube 110 functions as a pushing member to push the springs 104 and 105 with a pushing face 110a which is formed on the fore end side of its inner circumferential surface.

In the lens barrel 100, the inside diameter of the fore end tube 109 is arranged to be approximately the same as the outside diameter of the rectilinear motion tube 110. The fore end tube 109 and the rectilinear motion tube 110 are thus arranged to be movable relative to each other through the sliding contact of the inner circumferential surface of the fore end tube 109 and the outer circumferential surface of the rectilinear motion tube 110. The rectilinear motion tube 110 is fitted into the fore end tube 109 by rectilinearly or rotatively sliding over the inner circumferential surface of the fore end tube 109.

The fore end tube 109 is thus fitted on the rectilinear motion tube 110 on its base end side. A ring-shaped inner flange part 109c is formed on the inner fore end side of the fore end tube 109. A projection 109j is formed at an inner part further on the fore end side than the inner flange part 109c for the purpose of positioning the base seat 108. A circumferential groove part 109a is formed in the fore end tube 109 further on the fore end side than the projection 109j for the purpose of fitting the fancy cover 101 therein. Further, hole parts 109g and 109b are formed in the inner flange part 109c of the fore end tube 109 for the purpose of inserting projections 104b and 105b of the springs 104 and 105 therein.

The base seat 108 is formed in a shape to be fitted onto the inner circumferential face of the fore end part of the fore end tube 109. An aperture part 108f is formed in the middle of the main face of the base seat 108. The base seat 108 has a raised wall part 108p which is formed around the aperture part 108f. The raised wall part 108p is provided with grooves, stoppers, etc., for mounting the barrier members 102 and 103 in a swingable manner.

More specifically, various parts are arranged around the aperture part 108f as follows. Groove-shaped stopper parts 108i are arranged on the upper and lower sides of the aperture part 108f as viewed in FIG. 16 to allow the rear end parts of the barrier members 102 and 103 to enter there and to stop them from swinging. Stopper parts 108j are arranged on the right and left sides of the aperture part 108f, as viewed in FIG. 16, to have the fore end inner faces of the barrier members 102 and 103 respectively abut thereon. On the right and left inner sides of the stopper parts 108j, there are wall face parts 108l arranged to house the springs 104 and 105, hole parts (not shown) arranged to have about the same shape as the hole parts 109g and 109b of the fore end tube 109, and female screw parts 108m and 108n arranged to have screws 106 and 107 screwed therein. Further, on the two end sides in the longitudinal direction of each stopper part 108i, there are formed upper bearing parts 108b and 108c and lower bearing parts 108g and 108h which are arranged in an arcuate groove shape to hold the barrier members 102 and 103 in a swingable manner.

A cutaway part 108a is arranged in the upper end part of the base seat 108 to be used for positioning the base seat 108 with respect to the fore end tube 109. The base seat 108 is positioned by inserting it into the inner circumferential part of the fore end tube 109 while fitting a Y face 108d and an X face 108e of the cutaway part 108a respectively onto a Y face 109d and an X face 109e of the projection 109j of the fore end tube 109. The cutaway part 108a is thus caused to abut on the inner flange part 109c of the fore end tube 109. In this state, the base seat 108 is secured to the fore end tube 109 by bonding.

The barrier members 102 and 103 are in a plate-like shape and are made of an elastic material, such as hard rubber or the like. The barrier members 102 and 103 are provided respectively with rotation shaft parts 102b, 102c, 103b and 103c, which are disposed on the base end side of the barrier members 102 and 103.

The upper barrier member 102, i.e., a first barrier member, is mounted in a swingable manner on the base seat 108 which is in one body with the fore end tube 109 by fitting its rotation shaft parts 10b and 102c into the upper bearing parts 108b and 108c of the base seat 108. The lower barrier member 103, i.e., a second barrier member, is likewise mounted in a swingable manner on the base sear 108 by fitting its rotation shaft parts 103b and 103c into the lower bearing parts 108g and 108h of the base seat 108. The barrier member 102 is thus arranged to swing at a part above an optical axis of the optical lens disposed inside of the rectilinear motion tube 110. The other barrier member 103 is arranged to swing at a part below the optical axis. Further, the axes of swing of the barrier members 102 and 103 are in parallel with each other.

The rotation shaft part 102b of the barrier member 102 is provided with a hole part 102a which has the fore end part 105a of the spring 105 fitted therein. The rotation shaft part 103b of the barrier member 103 is likewise provided with a hole part 103a which has the fore end part 104a of the spring 104 fitted therein, as shown in FIG. 18(a).

To avoid irregular reflection of light, light-blocking grooved parts 103j, each composed of a plurality of grooves, are provided on the inner surfaces of the barrier members 102 and 103, as shown in FIG. 16.

Each of the springs 104 and 105 is formed by three-dimensionally bending a wire-like elastic member. In the case of the fifth embodiment, one-end parts of the springs 104 and 105 are arranged to interlink the barrier members 102 and 103 with each other. The other-end parts of the springs 104 and 105 are formed as ring-like fixing parts 104*d* and 105*d* which are arranged to permit screws 106 and 107 to be inserted therein. In each of the springs 104 and 105, an intermediate part between the two end parts is formed into a projection 104*b* or 105*b* which is arranged to be pushed by the pushing face 110*a* of the rectilinear motion tube 110. The two springs 104 and 105 are in the same shape. Therefore, for the sake of expedience, details of these springs are described below mainly covering only the spring 105.

The fore end part 105*a* of the spring 105 is connected to the barrier member 102 by fitting the fore end part 105*a* into the hole part 102*a* formed in the rotation shaft part 102*b* of the barrier member 102.

The fixing part 105*d* of the spring 105 is secured to the base seat 108 with the screw 107 inserted therein and screwed into the female screw part 108*n* of the base seat 108. At this time, the spring 105 has its projection 105*b* inserted into the above-stated hole part of the base seat 108 and also into a hole part 109*b* of the fore end tube 109.

Figure 17:
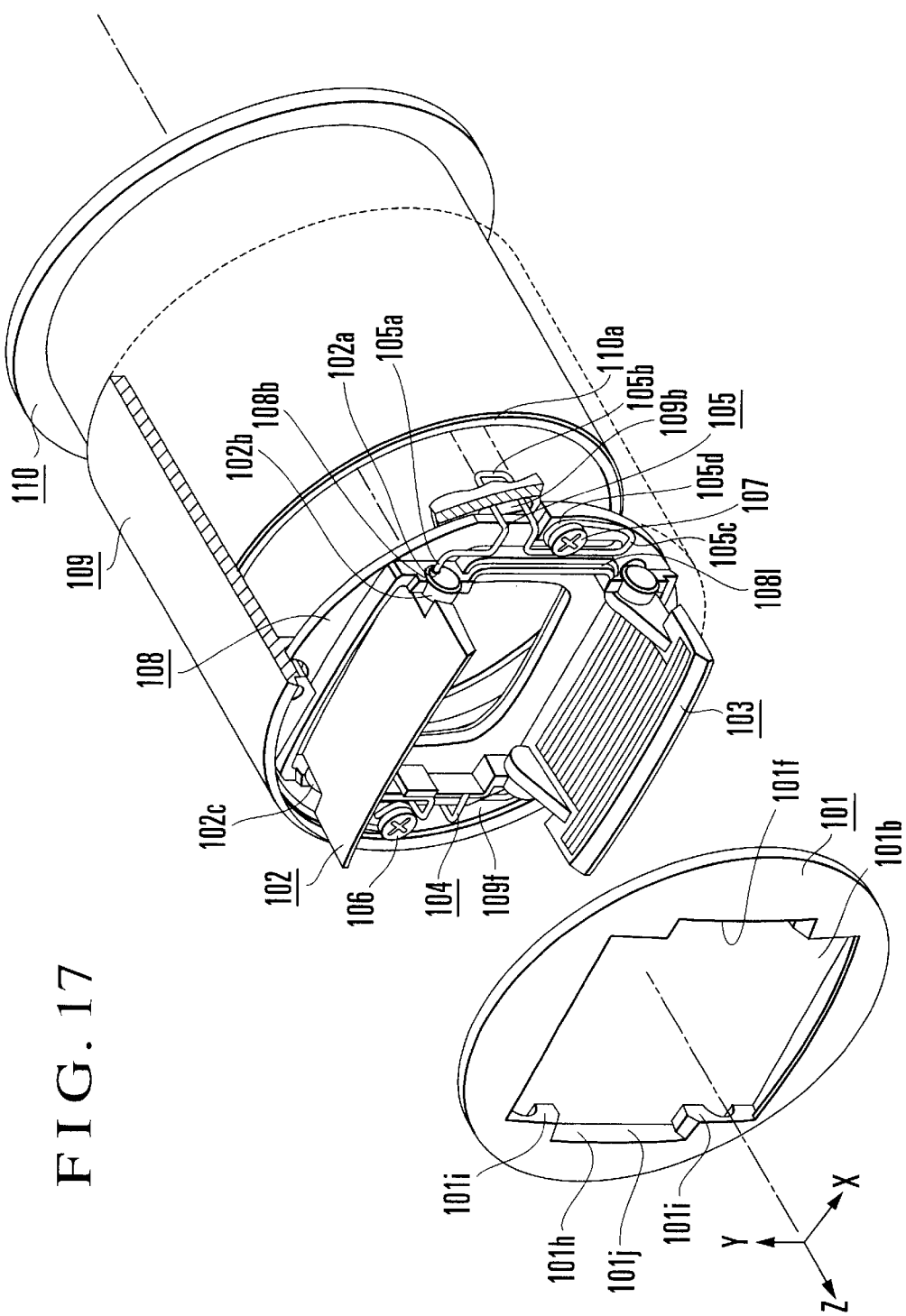
FIG. 17 is a partly cutaway view showing the lens barrel of the camera according to the fifth embodiment in a state of having the barrier (device) opened.
Figure 18:
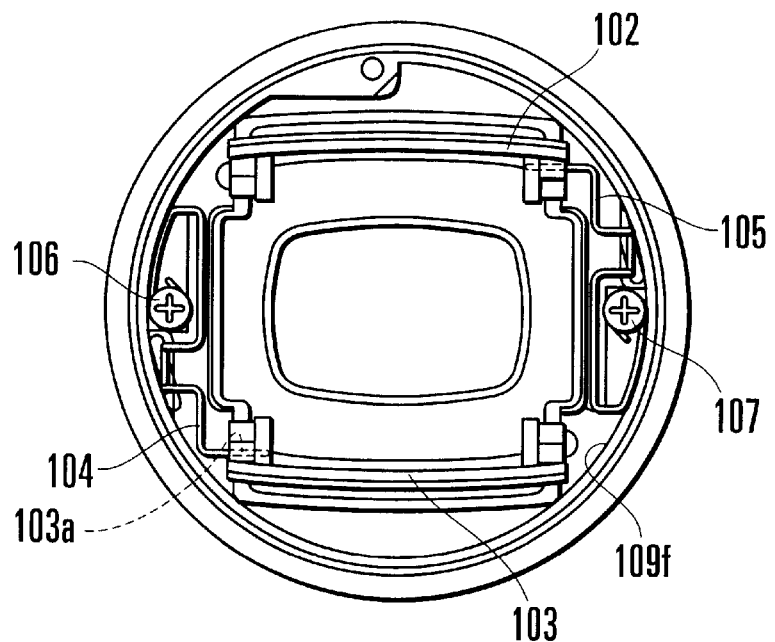
FIGS. 18(a) to 18(d) show the open state of the barrier in the fifth embodiment, FIG. 18(a) being a front view showing the lens barrel in a state of having its fancy cover removed, FIG. 18(b) being a sectional side view of the lens barrel including a YZ plane and excluding a lower barrier member, FIG. 18(c) being a side view of the lens barrel with a sectional view including the YZ plane showing only the fancy cover and a fore end tube, and FIG. 18(d) being a front view showing the fancy cover.
Figure 18:
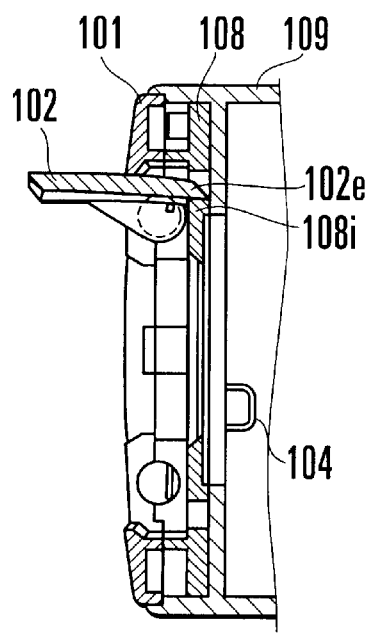

As shown in FIGS. 18(*b*), 18(*c*), 21, etc., the diameter of the fancy cover 101 is a little smaller than that of the fore end tube 109. The fancy cover 101 is secured to the fore end side of the fore end tube 109 with its rear face 101*a* attached by bonding to the circumferential groove part 109*a* of the fore end tube 109. The front (outer) surface of the fancy cover 101 is in a spherical shape. As shown in FIG. 17, the fancy cover 101 has an aperture part 101*b* formed in an approximately rectangular shape corresponding to the raised wall part 108*p* of the base seat 108. A cover part 101*j* which is in a flange-like shape is formed to extend from the aperture part 101*b* to a rear face 101*a*, as shown in FIG. 18(*d*). In this cover part 101*j* are included, as shown in FIGS. 17 and 23, side edge parts 101*f* and 101*h* formed in positions being opposed to the wall face parts 108*l* and other side edge parts 101*i* formed in positions opposed to the bearing parts 108*b*, 108*c*, 108*g* and 108*h* of the base seat 108. The springs 104 and 105 are set in positions by means of these parts. Further, as shown in FIG. 16, bearing parts having arcuate grooves are formed in the side edge parts 101*i* at positions which are opposed to the bearing parts 108*b*, 108*c*, 108*g* and 108*h* of the base seat 108. For the sake of expedience, FIG. 16 shows only the left half of the fancy cover 101. As to the bearing parts of the fancy cover 101, only the bearing parts 101*c* and 101*k* which correspond to the bearing parts 108*c* and 108*h* are shown. The right half of the fancy cover 101 is arranged in the same manner as the left half.

In the lens barrel 100, with the fancy cover 101 secured to the fore end of the fore end tube 109 as described above, one of the rotation shaft parts (102*c*) of the barrier member 102 is rotatably carried jointly by the bearing part 101*c* of the fancy cover 101 and the bearing part 108*c* of the base seat 108. The other rotation shaft parts (102*b*) of the barrier member 102 is also rotatably carried jointly by a bearing part (not shown) of the fancy cover 101 and the bearing part 108*b* of the base seat 108. With regard to the other barrier member 103, its rotation shafts 103*b* and 103*c* are also carried in a rotatable manner by the bearing parts 108*g* and 108*h* of the base seat 108 and the bearing parts of the fancy cover 101 including the bearing part 101*k* and another which is not shown.

Further, with the fancy cover 101 secured to the fore end side of the fore end tube 109, the cover part 101*j* which includes the side edge parts 101*f*, 101*h* and 101*i* of the fancy cover 101 abuts on the raised wall part 108*p* which includes the wall face 108*l* of the base seat 108 in such a way as to cover and hide the springs 104 and 105. The springs 104 and 105 in the lens barrel 100 are thus encompassed with the inner wall part 109*f* of the fore end tube 109, the wall face 108*l* of the base seat 108, the front surface of the base seat 108 and the back surface of the fancy cover 101. Since no external light reaches the spring 105, no light comes toward the rectilinear motion tube 110 through the hole parts of the base seat 108 and the hole part 109*b* of the fore end tube 109. The inside of the lens barrel 100 is, therefore, completely shielded from light. Besides, the springs 104 and 105 are effectively prevented from deteriorating as external light and dust are blocked from coming to the part where these springs are located.

The shape and allocation of the spring 105 are described further in detail with reference to FIG. 17 as follows. FIG. 17 shows in a perspective view the barrier members 102 and 103 in an open state. For the sake of expedience, the illustration of FIG. 17 omits the fancy cover 101 and shows the fore end tube 109 in a sectional state with the right half thereof excluded from the illustration. The spring 105 is located further outward than the barrier members 102 and 103 and also on the outside of the wall face part 108*l* of the base seat 108. The spring 105 is, as mentioned above, encompassed with the inner wall part 109*f* of the fore end tube 109, the wall face 108*l* of the base seat 108, the front surface of the base seat 108 and the back surface of the fancy cover 101.

As shown in FIG. 17, the spring 105 has a bent part 105*c* which extends from a fixed part 105*d* along the shape of the base seat 108 in the direction of −Y (downward), and turns at the lower end of the wall face part 108*l* of the base seat 108 to extend in the opposite direction. The spring 105 further extends from the bent part 105*c* in the direction of +Y (upward), turns in the direction of +X at a point where it passes the head part of the screw 107, and further turns in the direction of −Z, forming the projection 105*b*.

The projection 105*b* passes through the hole part of the base seat 108 and the hole part 109*b* of the fore end tube 109 to face the pushing face 110*a* of the rectilinear motion tube 110 and turns back to pass again the hole part of the base seat 108 and the hole part 109*b* of the fore end tube 109. The spring 105 is then bent in the direction of −X at a point where it has passed the hole part of the base seat 108. The spring 105 is further bent at the wall face part 108*l* of the base seat 108 in the direction of +Y. After that, the spring 105 is lastly bent in the direction of −X to form a fore end part 105*a* where it is inserted into the hole part 102*a* of the barrier member 102. The direction in which the fore end part 105*a* of the spring 105 is inserted into the hole part 102*a* of the barrier member 102 is in parallel with the rotation shaft of the barrier member 102.

With the spring 105 formed in the above-stated shape, when the barrier member 102 is in its open state as shown in FIG. 17, the fore end part 105*a* of the spring 105 tries to further move in the composite direction of −Z and +X. However, a component of the moving force in the direction of −Z is nullified by receiving it at the hole part 102*a* of the barrier member 102. Another component of the force in the direction of +X is nullified by sliding of the fore end part 105*a* within the hole part 102*a* of the barrier member 102. Meanwhile, the projection 105*b* also tries to further move in the composite direction of −Z and +X. However, since the spring 105 is restricted at the fore end part 105*a* and the fixed part 105*d*, a component of the moving force in the direction of −Z is converted into a flexion in the direction of −Z. Another component in the direction of +X causes a displacement of the projection 105*b* until the projection 105*b* comes into contact with the inner wall part 109*f* of the fore end tube 109.

The shape and arrangement of the other spring 104 are the same as those of the spring 105 described.

Figure 18C:
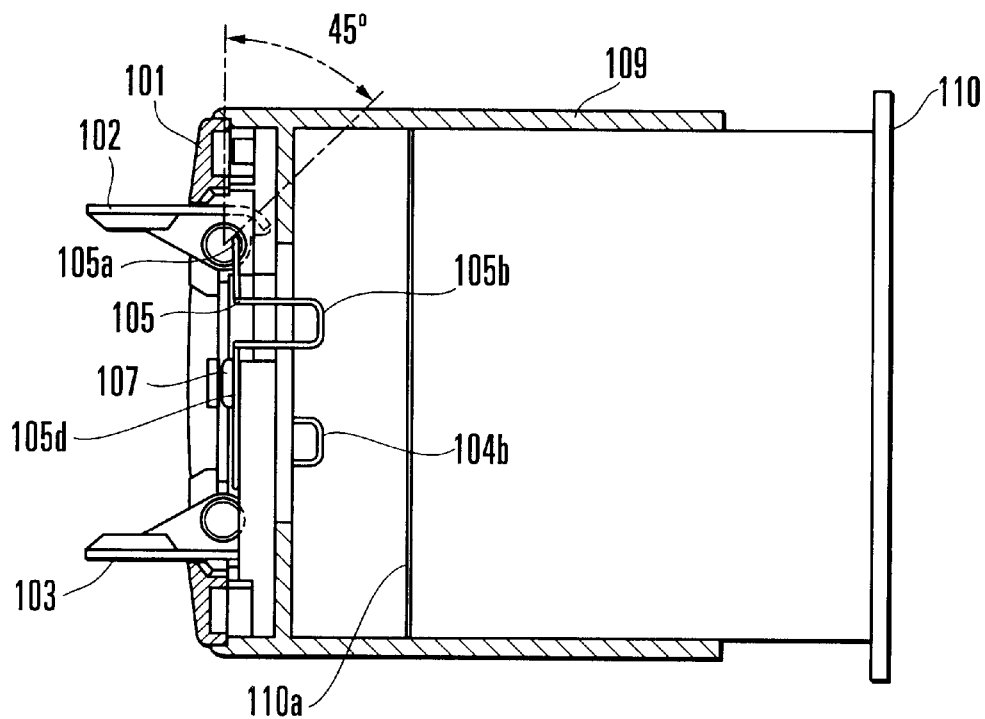
Figure 18D:
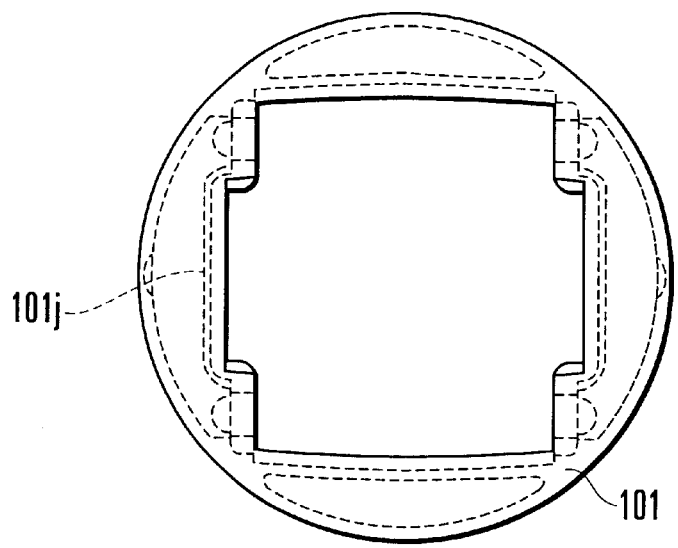

The barrier opening and closing actions in the fifth embodiment are as follows. FIGS. 18(a) to 18(d) show the lens barrel in a state of having the barrier opened. FIG. 18(a) is a front view showing the lens barrel with the fancy cover 101 excluded from the illustration. FIG. 18(b) is a sectional side view showing the lens barrel, excluding the barrier member 103 and including a YZ plane. FIG. 18(c) is a side view with a sectional view including the YZ plane showing only the fancy cover 101 and the fore end tube 109. FIG. 18(d) is a front view of the fancy cover 101.

The spring 105 has its fixed part 105d secured to the base seat 108 with the screw 107 while its fore end part 105a is fitted into the hole part 102a of the barrier member 102. Therefore, in the state in which the pushing face 110a of the rectilinear motion tube 110 is not pushing the projection 105b of the spring 105 as shown in FIG. 18(c), a force is exerted to move the fore end part 105a toward the rectilinear motion tube 110 (in the direction of −Z). This force causes the barrier member 102 to swing on its rotation shaft 102b to its open position. Then, as shown in FIG. 18(b), the swing of the barrier member 102 is brought to a stop where the rear end part 102e collides with a stopper 108i of the base seat 108. At this time, the hole part 102a of the barrier member 102 in which the fore end part 105a of the spring 105 is fitted is at an angle of 45 degrees to the center of swing, i.e., with respect to the XY plane passing through the center of swing, as shown in FIG. 18(c).

The other barrier member 103 is also arranged to be caused to swing in the same manner and to come to a stop at an angle of 45 degrees with respect to the XY plane which passes through the center of swing.

Figure 19:
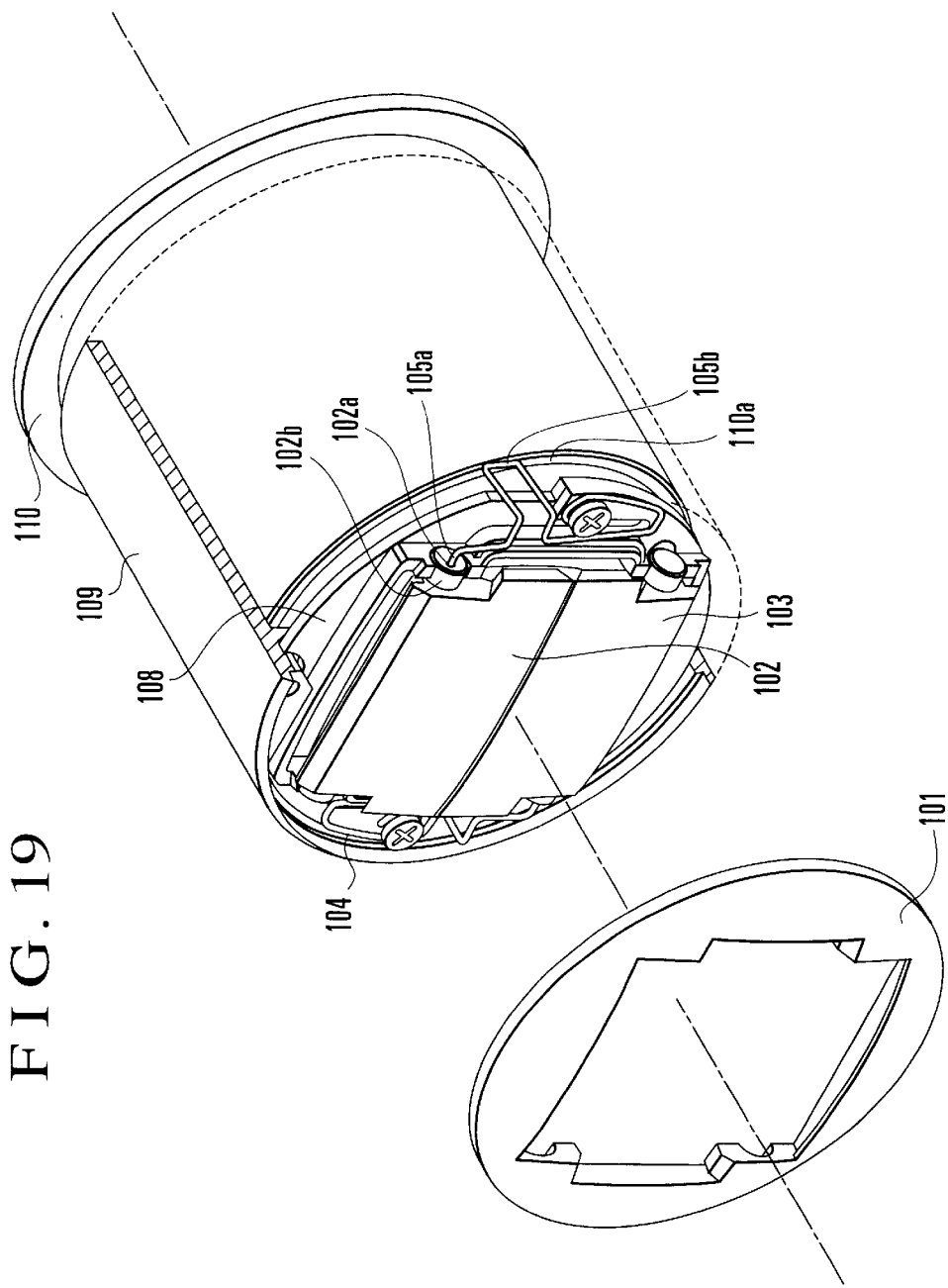
FIG. 19 is a partly cutaway view showing the lens barrel of the camera according to the fifth embodiment in a state of having the barrier thereof closed.
Figure 20:
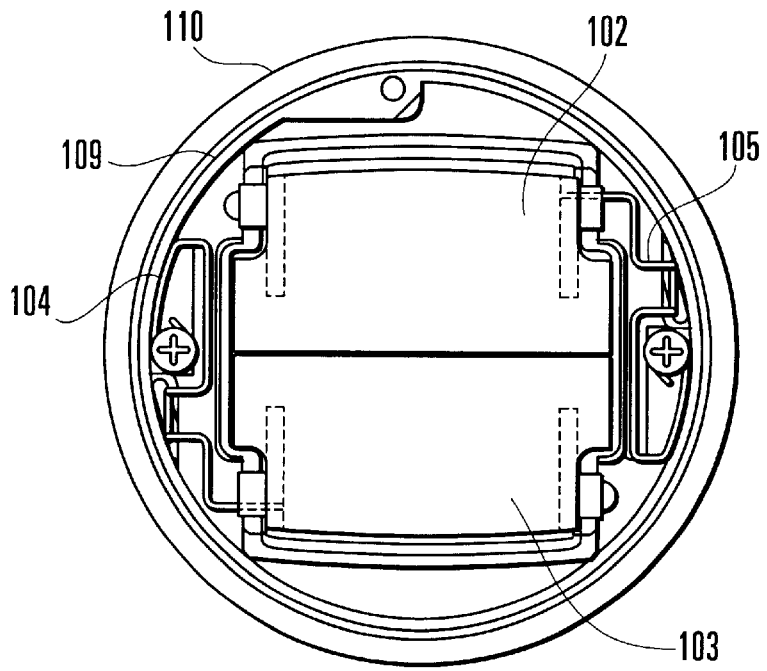
FIGS. 20(a) and 20(b) show the lens barrel in the fifth embodiment in a state of having the barrier closed, FIG. 20(a) being a front view showing the lens barrel with the fancy cover removed, and FIG. 20(b) being a side view showing the lens barrel with a sectional view including the YZ plane showing only the fancy cover and the fore end tube.
Figure 20:
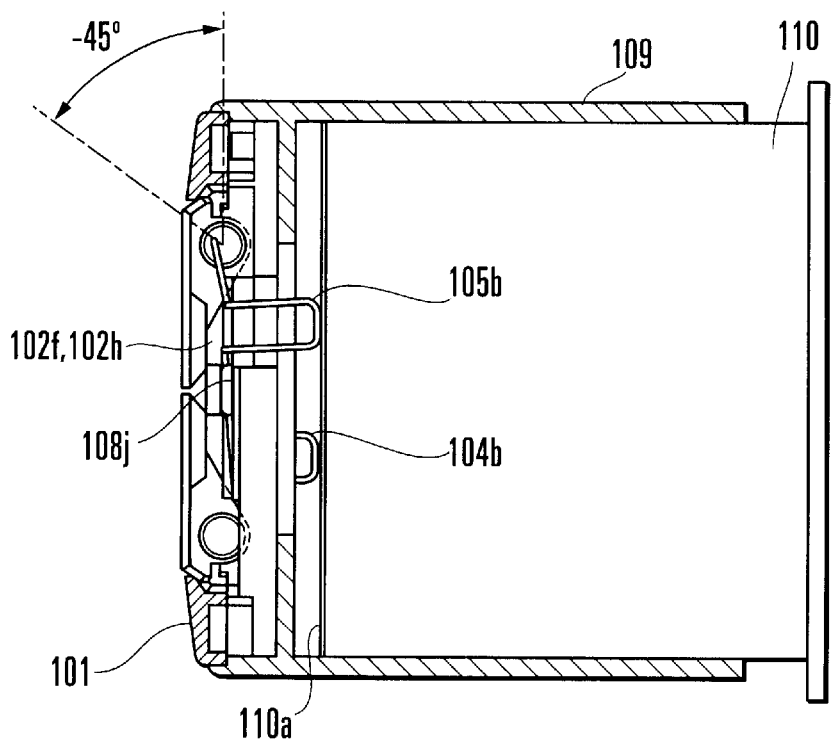

Next, when the rectilinear motion tube 110 is drawn out toward the object (in the direction of +Z), the projection 105b of the spring 105 is pushed by the pushing face 110a of the rectilinear motion tube 110. This causes the fore end part 105a of the spring 105 to move toward the object (in the direction of +Z) against the force of moving it toward the rectilinear motion tube 110 (in the direction of −Z). Then, the spring 105 elastically deforms to cause the barrier member 102 to swing on its rotation shaft 102b. As a result, the barrier member 102 comes to a closed position as shown in FIGS. 19, 20(a) and 20(b). Meanwhile, the other barrier member 103 which is in connection with the other spring 104 also swings in the same manner to come to a closed position as shown in FIGS. 19, 20(a) and 20(b).

FIG. 19 shows the lens barrel in the state of having the barrier, i.e., the barrier members, in the closed state. FIG. 19 shows, for the sake of expedience, the lens barrel with the fancy cover 101 excluded from the illustration and the fore end tube 109 in a sectional view. FIGS. 20(a) and 20(b) also show the lens barrel in the state of having the barrier closed. FIG. 20(a) is a front view showing the barrier with the fancy cover 101 excluded from the illustration. FIG. 20(b) is a side view with a sectional view including the YZ plane showing only the fancy cover 101 and the fore end tube 109.

The barrier members 102 and 103 are closed in the following manner. When the rectilinear motion tube 110 is moved toward the object, the pushing face 110a of the rectilinear motion tube 110 pushes the projection 105b of the spring 105 toward the object, i.e., in the direction of +Z. This causes the fore end part 105a of the spring 105 to try to flex or deflect toward the object, i.e., in the direction of +Z.

The spring 105 is secured to the base seat 108 with the screw 107 while its fore end part 105a fitted in the hole part 102a of the barrier member 102. When the projection 105b of the spring 105 is pushed by the pushing face 110a of the rectilinear motion tube 110, therefore, the spring 105 moves its fore end part 105a toward the object (in the direction of +Z) by spreading the root part of the projection 105b. The movement of the fore end part 105a of the spring 105 then causes the barrier member 102 to swing on its rotation shaft 102b to its closed position.

Then, as shown in FIG. 20(b), the barrier member 102 stops its swing when its side end part 102h comes to collide against the stopper part 108j of the base seat 108. At this time, the hole part 102a of the barrier member 102 in which the fore end part 105a of the spring 105 is fitted is at an angle of −45 degrees to the center of swing, i.e., with respect to the XY plane passing through the center of swing, as shown in FIG. 20(b).

The other barrier member 103 is also arranged to be caused to swing in the same manner and to come to a stop at an angle of −45 degrees with respect to the XY plane which passes through the center of swing.

When the rectilinear motion tube 110 moves from its position at which the barrier is closed as shown in FIG. 20(b) toward the camera body, i.e., in the direction of −Z, the spring 105 moves its fore end part 105a by spreading the root part of the projection 105b to cause the barrier member 102 to swing to its open state as shown in FIGS. 17, 18(a) to 18(d) and 23. The other spring 104 and the other barrier member 103 also act in the same manner.

Figure 21:
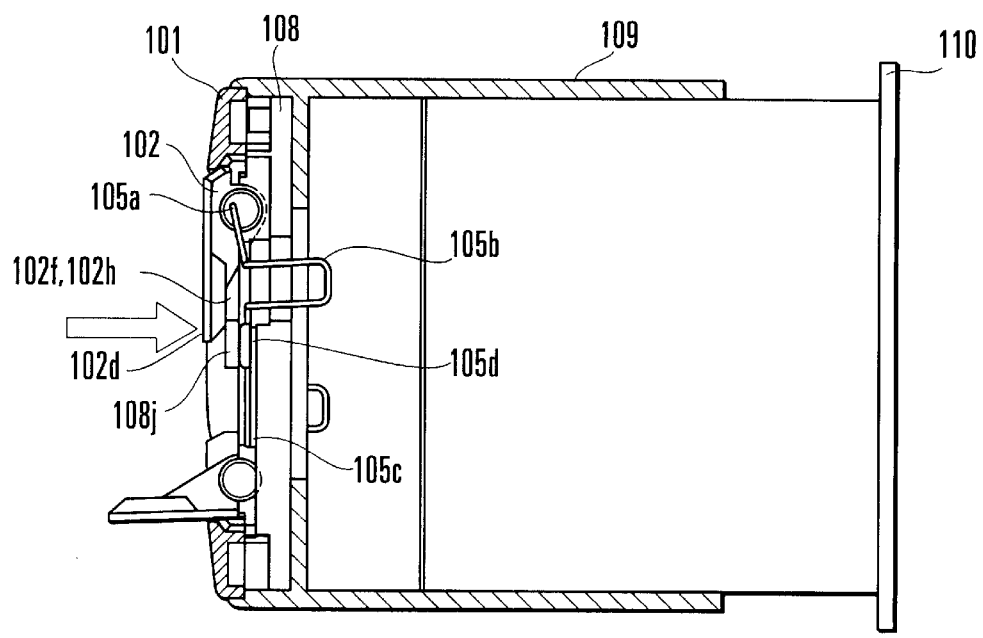
FIG. 21 is a side view for explaining a situation in which, in the fifth embodiment, after a rectilinear motion tube is moved in the direction of parting from each spring and each barrier member is opened, an upper barrier member is forcibly pushed from the open position in the direction of an arrow toward a closed position.

FIG. 21 shows how the barrier member 102 is closed from the state of having the barrier members 102 and 103 at their open positions. The barrier member 102 is closed with the rectilinear motion tube 110 moved in the direction of −Z to cause the fore end part 102d of the barrier member 102 to be forcibly pushed in the direction of an arrow.

At this time, the fore end part 105a of the spring 105 which is fitted in the hole part 102a of the barrier member 102 is forcibly displaced in the direction of Z. Since the spring 105 is secured to the base seat 108 at its fixed part 105d, the displacement of the fore end part 105a is converted into elasticity (positional energy) mainly by the deformation of a part of the spring 105 between the fore end part 105a and the projection 105b.

When the side end part 102h of the barrier member 102 comes to abut on the stopper part 108j of the base seat 108, the barrier member 102 comes to a stop and the positional energy reaches a maximum energy. Under this condition, the spring 105 is compressed to have its projection 105b become vertically shorter than in its initial state. As a result, there is developed a force to bring the projection 105b back to its initial state. Further, there is also developed another force to move back the fore end part 105a in the directions of +Y (upward as viewed in FIG. 21) and −Z (toward the rectilinear motion tube 110). Therefore, upon removable of the forcible power exerted to move the barrier member 102 in the direction of the arrow as shown in FIG. 21 in this state, the elastic force of the spring 105 causes the barrier member 102 to open again to bring about the state shown in FIGS. 17, 18(a) to 18(d) and 23.

Figure 22:
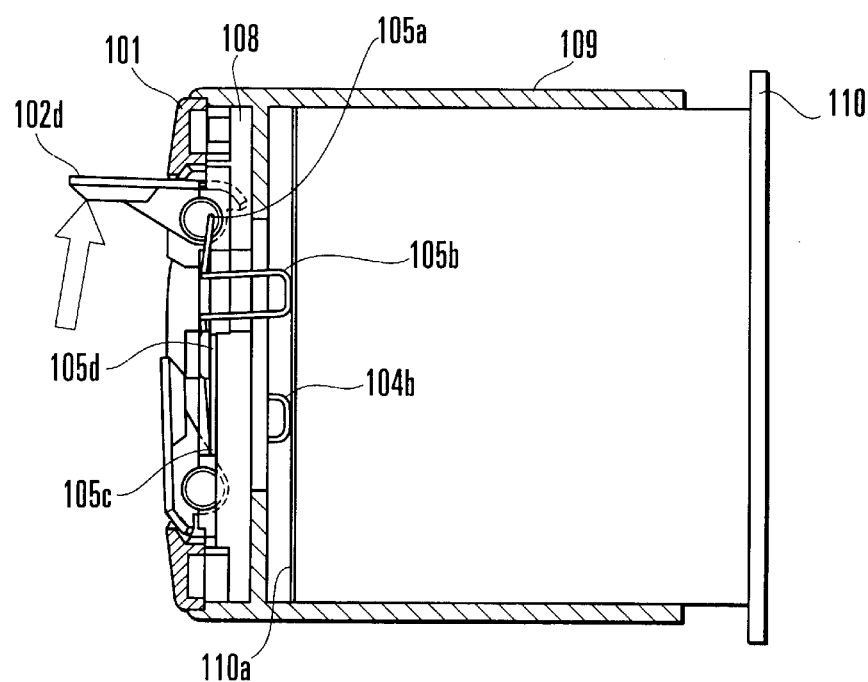
FIG. 22 is a side view for explaining a situation in which, in the fifth embodiment, after the rectilinear motion tube is moved in the direction of pushing each spring and each barrier member is closed, the upper barrier member is forcibly pushed from the closed position in the direction of an arrow toward the open position.

FIG. 22 shows a state in which the rectilinear motion tube 110 is located in the direction of +Z, and the barrier member 102 is opened by forcibly pushing the fore end part 102d of the barrier member 102 in the direction of an arrow from its position obtained with both the barrier members 102 and 103 closed.

In this instance, as apparent from comparison with FIG. 18(b), the fore end part 105a of the spring 105 which is fitted in the hole part 102a of the barrier member 102 is forcibly displaced in the direction of −Z. Then, since the spring 105 is secured to the base seat 108 at its fixed part 105d, the displacement of the fore end part 105a is converted into an elasticity (positional energy) mainly by the deformation of a part of the spring 105 between the fore end part 105a and the projection 105b.

Then, when the rear end part 102e of the barrier member 102 abuts on the stopper part 108i of the base seat 108, the barrier member 102 comes to a stop and the positional energy reaches a maximum energy as mentioned in the foregoing with reference to FIG. 18(b). Therefore, upon removable of the forcible power exerted to move the barrier member 102 in the direction of the arrow, the elastic force of the spring 105 causes the barrier member 102 to close again to bring about the state shown in FIG. 24.

The lens barrel is arranged to have the fitting direction in which the fore end parts 104a and 105a of the spring 104 and 105 are fitted into the holes 102a and 103a of the barrier members 102 and 103 to be parallel respectively with the rotation shafts of the barrier members 102 and 103. This arrangement ensures that no component force in the direction of X of the springs 104 and 105 is transmitted to the barrier members 102 and 103. Only the forces in the directions of Y and Z that are necessary for swinging the barrier members 102 and 103 are transmitted to the barrier members 102 and 103 so that the barrier members 102 and 103 can be smoothly swung. Further, the barrier members 102 and 103 are connected to the spring 104 and 105 at the end faces of the approximately cylindrical rotation shafts 102b and 101c of the barrier members 102 and 103. That arrangement permits reduction in thickness of the whole barrier opening-and-closing device.

Further, the projections 104b and 105b of the springs 104 and 105 are urged in the direction of the outside diameter of the fore end tube 109. This keeps the projections 104b and 105b in contact with the inner. surface of the fore end tube 109. The projections 104b and 105b, therefore, can be brought into contact with the front circumferential face of the rectilinear motion tube 110 without fail.

The shapes, etc., of the fancy (decorative) cover 101 and the barrier members 102 and 103 are described below with reference to FIGS. 23 and 24, which are perspective views showing the appearance of the lens barrel 100.

In the lens barrel 100, the front surface of the fancy cover 101 has a spherical surface. The outside surfaces of the barrier members 102 and 103 are also in spherical shapes having about the same curvature as the spherical surface of the fancy cover 101.

The edge parts 102f and 102h on the fore end side of the barrier member 102 are arranged to be wider than the edge parts 102g and 102i on the base end side located near to the rotation shaft part. The barrier member 103 is also in the same shape. This shape enables the lens barrel 100 to allow a light flux from the object to be led to the lens without any restriction on size in the horizontal direction necessary for forming an image.

When the barrier members 102 and 103 are in an open state as shown in FIG. 23, a boundary line between the upper end part 101e of the fancy cover 101 and the rear end part 102e of the barrier member 102 is about equal to an arc which is formed by geometrical crossing of the front spherical surface of the fancy cover 101 and the outer spherical surface of the barrier member 102.

As mentioned above, in the lens barrel 100, the curvature of the front spherical surface of the fancy cover 101 is about the same as that of each of the outer spherical surfaces of the barrier members 102 and 103. Therefore, when the barrier members 102 and 103 are closed, as shown in FIG. 24, the front surface of the fancy cover 101 and the outer surfaces of the barrier members 102 and 103 form a smooth spherical shape, so that external matters, dust or the like can be prevented from sticking to the surface. Further, with the lens barrel in this shape, when the barrier is opened, the fore ends of the barrier members 102 and 103 come to show an arcuate shape which effectively cuts unnecessary rays of incident light to give a higher hooding effect.

Further, according to the arrangement of the lens barrel described, the barrier members 102 and 103 vertically open to give a hooding effect by themselves. The upper barrier member 102 prevents the incidence of sunlight on the fore end lens surface from above and thus effectively prevents flare ghost. The upper barrier member 102 also prevents rainwater or snowflake from sticking to the lens surface, so that the quality of pictures can be prevented from degrading. The lower barrier member 103 prevents incidence of unnecessary light, such as sunlight reflected by a water surface, from below, so that the quality of pictures can be also prevented from degrading. Besides, the arrangement of the barrier members permits the barrier opening-and-closing device to be formed in a compact size with a fewer number of parts.

The boundary line between the fancy cover 101 and each of the barrier members 102 and 103 which is nearly in parallel with and close to the rotation shaft of the barrier member 102 or 103 is approximately in an arcuate shape when the barrier members are closed. By virtue of this shape, clearances between the fancy cover 101 and the barrier members 102 and 103 can be minimized to effectively prevent external light or dust from entering into the barrier opening-and-closing device from outside. This gives a high hooding effect to lessen the possibility of having ghost flare.

In the lens barrel 100 in the fifth embodiment, the springs 104 and 105 are arranged to constantly urge the barrier members 102 and 103 in the opening direction. Therefore, the barrier members 102 and 103 close to prevent a finger print or the like from sticking to the lens surface and thus to prevent picture quality from degrading when the barrier members 102 and 103 are pushed by a finger or the like. Further, in the event of an impact caused by a fall of the camera while the camera is in a photo-taking state, the barrier members 102 and 103 close and the impact can be absorbed in part by the springs 104 and 105 to minimize a possible damage of the barrier members 102 and 103. Further, in a case where the barrier members 102 and 103 are formed with an elastic material such as hard rubber, the barrier members 102 and 103 first come into contact with the ground in the event of an impact caused by a fall while the camera is in the photo-taking state. Then, the impact is. absorbed by the deformation of the barrier members 102 and 103 themselves as well as by that of the springs 104 and 105 taking place when the barrier members 102 and 103 close. Such absorbing actions effectively lessen possible damages of the lens barrel and the camera body.

Further, the springs 104 and 105 are arranged to come into contact with the rectilinear motion tube 110 in the lens barrel 100 at their projections 104b and 105b which extend toward the rectilinear motion tube 110 along the optical axis. The projections 104b and 105b are in a state of being urged toward the outer side of the fore end tube 109. The base seat 108 and the rectilinear motion tube 110 have hole parts arranged to allow these projections 104b and 105b to pass therethrough. This arrangement enables the pushing force of the rectilinear motion tube 110 to be efficiently transmitted to the springs 104 and 105 with a few number of parts. Further the barrier members 102 and 103 are connected to the springs 104 and 105 at the end faces of the rotation shafts 102b and 103b of the barrier members 102 and 103. That arrangement permits reduction in thickness of the barrier opening-and-closing device. Further, since each of the barrier members 102 and 103 is connected to the spring 104 or 105 only at one part, the barrier opening-and-closing device can be assembled without difficulty.

Further, each of the springs 104 and 105 is arranged to be connected to the barrier members 102 or 103 only at its one end and to the rectilinear motion tube 110 at the other end while the projection 104b or 105b is formed at its intermediate part to be pushed by the rectilinear motion tube 110. The arrangement ensures that the movement of each projection is transmitted directly to the part where the spring is connected to the barrier member 102 or 103, so that the barrier opening and closing actions can be quickly carried out.

(Sixth Embodiment)

A barrier opening-and-closing device according to a sixth embodiment of the invention is described below. FIGS. 25(a) to 25(c) show essential parts of a lens barrel 200 having the barrier opening-and-closing device according to the sixth embodiment. FIG. 25(a) is a front view showing a barrier in an open state with a fancy cover excluded from the illustration. FIG. 25(b) is a side view showing the barrier in the open state with a sectional view including a YZ plane showing only the fancy cover and a fore end tube. FIG. 25(c) is a sectional side view showing the barrier in a closed state.

Referring to FIGS. 25(a) to 25(c), the lens barrel 200 has a fore end tube 209, a rectilinear motion tube 210 arranged to be rectilinearly slidable in a state of being fitted in the fore end tube 209, a base seat 208 secured by bonding to the front face of the fore end tube 209, a pair of barrier members 202 and 203, springs 204 and 205 arranged to urge the barrier members 202 and 203, screws 206 and 207 arranged to secure the springs 204 and 205 to the base seat 208, and a fancy cover 201. The fore end tube 209, the rectilinear motion tube 210, the base seat 208, the fancy cover 201, the barrier members 202 and 203 and the screws 206 and 207 are arranged in approximately the same manner as those of the fifth embodiment described above and, therefore, the details of them are omitted from the following description.

The sixth embodiment differs from the fifth embodiment in the arrangement of the springs 204 and 205. Therefore, the positions of the screws 206 and 207 which are screwed into the base seat 208 also differ from those in the fifth embodiment. Since the springs 204 and 205 are in the same shape, the following describes in detail only the arrangement of the spring 205.

The spring 205 has a fore end part 205a fitted into a hole part 202a of the barrier member 202, and a projection 205b which protrudes toward the pushing face 210a of the rectilinear motion tube 210. The shapes of these parts are approximately the same as those of the corresponding parts of the fifth embodiment. Further, the spring 205 has a fixed part 205d at which the screw is secured to the base seat 208. The position and the shape of the fixed part 205d differ from those in the fifth embodiment. In addition to this difference, an end part opposite to the fore end part 205a of the spring 205 is a bent end part 205c which is bent approximately in the direction of an X axis.

The fixed part 205d of the spring 205 is secured to the base seat 208 with the screw 207. The fore end part 205a of the spring 205 is fitted into the hole part 202a of the barrier member 202. The fixed part 205d and the fore end part 205a of the spring 205 are nearly on one and the same XY plane. The projection 205b which is an intermediate part of the spring 205 extends from the XY plane in the direction of −Z in parallel with an optical axis toward the rectilinear motion tube 210 through a first hole part 209b of the fore end tube 209. The bent part 205c extends further from the fixed part 205d in the direction of −X through a penetrating groove 208k of the base seat 208. A clearance between the penetrating (through) groove 208k and the spring 205 is sufficiently small to prevent any leak of light.

The other spring 204 is likewise secured to the base seat 208 with a screw 208. A fore end part 204a of the spring 204 is fitted in a hole part 203a of the barrier member 203. In the state shown in FIG. 25(b), the fore end part 205a of the spring 205 is trying to flex toward the camera body (in the direction of −Z). Therefore, in this state, the barrier member 202 swings on its rotation shaft 202b to come to a stop at a barrier opened position. At this time, the hole part 202a of the barrier member 202 in which the fore end part 205a of the spring 205 is fitted is at an angle of 30 degrees with respect to the XY plane. Meanwhile, the other barrier member 203 opens in the same manner and has its hole part 203a also at the angle of 30 degrees with respect to the XY plane.

When the rectilinear motion tube 210 is drawn out toward the object (in the direction of +Z), as shown in FIG. 25(c), a pushing face 210a of the rectilinear motion tube 210 pushes the projection 205b of the spring 205 and the projection 204b of the spring 204 upward. The fore end part 205a of the spring 205 is displaced in the direction of +Z. This displacement causes the barrier member 202 to swing on the rotation shaft 202b. The fore end of the barrier member 202 collides against a stopper part 208j of the base seat 208. This brings the swinging motion of the barrier member 202 to a stop at its closed position. The other barrier member 203 likewise comes to a stop at its closed position. At this time, the hole part 202a of the barrier member 202 in which the fore end part 205a of the spring 205 is fitted is at an angle of −60 degrees with respect to the XY plane. Then, the other barrier member 203 closes in the same manner and has its hole part 203a also at the angle of −60 degrees with respect to the XY plane.

With the lens barrel 200 in the sixth embodiment arranged as described above, the sixth embodiment has the following advantages, in addition to the same advantages of the fifth embodiment.

Each of the springs 204 and 205 has their parts other than the projection 204b or 205b arranged to be within one and the same plane and the flexing angle to be not exceeding 90 degrees. This arrangement facilitates machining work on the springs 204 and 205 to permit reduction in cost of manufacture.

Further, the angles of the hole parts 202a and 203a of the barrier members 202 and 203 are arranged to be a small angle of 30 degrees when the barrier is open. By virtue of that arrangement, the flexing force in the direction of −Z of the fore end of each of the springs 205 and 204 can be efficiently converted into a force of opening the barrier member, and a force required for holding the barrier in its open state becomes large. Therefore, the barrier cannot be easily moved by an accidental external force such as the force of a finger inadvertently exerted while the barrier is open during a photo-taking operation. Therefore, a trouble such as an accidental eclipse of a necessary image forming light flux by the barrier can be avoided.

(Seventh Embodiment)

A barrier opening-and-closing device according to a seventh embodiment of the invention is next described with reference to FIGS. 26(a) to 26(c).

Figure 26A:
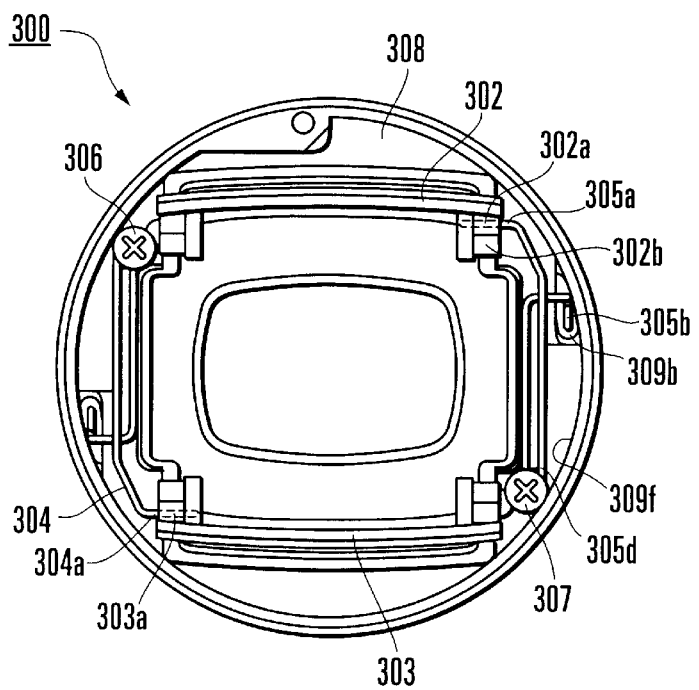
FIGS. 26(a) to 26(c) show a barrier device according to a seventh embodiment of the invention, FIG. 26(a) being a front view showing the barrier device in a state of having a barrier at an open position with a fancy cover excluded from the illustration, FIG. 26(b) being a side view showing the barrier device in a state of having the barrier at the open position with a sectional view including the YZ plane showing only the fancy cover and a fore end tube, and FIG. 26(c) being a side view showing the barrier device in a state of having the barrier at a closed position.
Figure 26B:
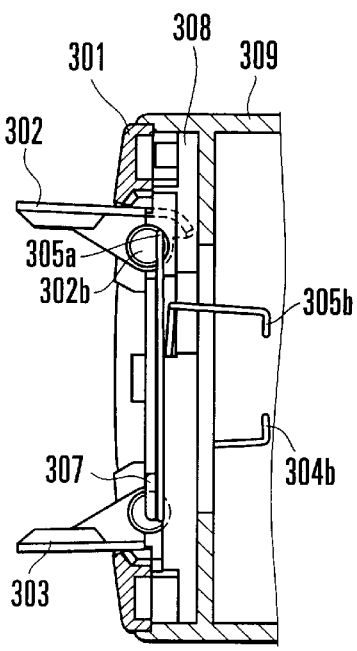
Figure 26C:
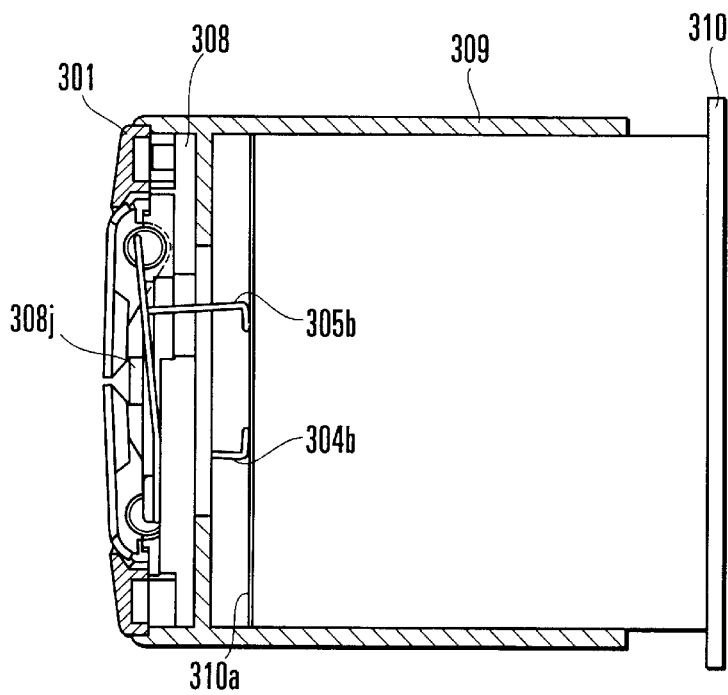

FIGS. 26(a) to 26(c) show essential parts of a lens barrel 300 having the barrier opening-and-closing device according to the seventh embodiment. FIG. 26(a) is a front view showing a barrier in an open state with a fancy cover excluded from the illustration. FIG. 26(b) is a side view showing the barrier in the opened state with a sectional view including a YZ plane showing only the fancy cover and a fore end tube. FIG. 26(c) is a sectional side view showing the barrier in a closed state.

Referring to FIGS. 26(a) to 26(c), the lens barrel 300 has a fore end tube 309, a rectilinear motion tube 310 arranged to be rectilinearly slidable in a state of being fitted in the fore end tube 309, a base seat 308 secured by bonding to the front face of the fore end tube 309, a pair of barrier members 302 and 303, springs 304 and 305 arranged to urge the barrier members 302 and 303, screws 306 and 307 arranged to secure the springs 304 and 305 to the base seat 308, and a fancy cover 301.

The fore end tube 309, the rectilinear motion tube 310, the base seat 308, the fancy cover 301, the barrier members 302 and 303 and the screws 306 and 307 are arranged in approximately the same manner as these of the fifth and sixth embodiments described above and, therefore, the details of them are omitted from the following description.

The seventh embodiment differs from the fifth and sixth embodiments in the arrangement of the springs 304 and 305. Therefore, the positions of the screws 306 and 307 which are screwed into the base seat 308 differ from those in the fifth embodiment but are about the same as those in the sixth embodiment. Since the springs 304 and 305 are in the same shape, the following describes in detail only the arrangement of the spring 305.

The spring 305 has a fore end part 305a connected to the barrier member 302, and another end part on the opposite side is formed as a projection 305b which is to be pushed by the rectilinear motion tube 310. A part between the fore end part 305a and the projection 305b is bent backward into a U-shaped part as a fixed part 305d. The U-shaped fixed part 305d is secured to the base seat 308 and the fore end tube 309.

The fixed part 305d of the spring 305 is secured to the base seat 308 which is mounted on the fore end tube 309. The fore end part 305a of the spring 305 is fitted into a hole part 302a of the barrier member 302.

The spring 305 has the fixed part 305d and the fore end part 305a located approximately within one and the same XY plane. As shown in FIGS. 26(a) to 26(c), the spring 305 is bent back approximately into the U shape from the fixed part 305d within the XY plane to extend in the direction of +Y and is then bent in the direction of +X at a point lower than the fore end part 305a. The spring 305 is further bent to extend in the direction of −Z in parallel with an optical axis in such a way as to extend toward the rectilinear motion tube 310 through a hole part 309b of the fore end tube 309. The fore end of the spring 205 in this direction is bent in the direction of −Y to form the projection 305b.

The other spring 304 is also secured to the base seat 308 with the screw 306. The fore end part 304a of the spring 304 is fitted into a hole part 303a of the barrier member 303.

When the rectilinear motion tube 310 is not pushing the projection 305b of the spring 305, the fore end part 305a tries to flex toward the camera body (in the direction of −Z). This causes the barrier member 302 to swing on its rotation shaft 302b and to come to a stop at an open position as shown in FIG. 26(b). At this time, the hole part 302a of the barrier member 302 in which the fore end part 305a of the spring 305 is fitted is at an angle of 45 degrees with respect to the center of swing and with respect to the XY plane which passes the center of swing. Then, the other barrier member 303 opens in the same manner and has its hole part 303a also at the angle of 45 degrees.

Further, the barrier member 303 is caused to swing by a similar mechanism and comes to a stop at the angle of 45 degrees relative to the XY plane which passes the center of swing.

The projection 305b of the spring 305 is arranged to flex toward the camera body (in the direction of −Z) and in the direction of the outer diameter (in the direction of +X). As shown in FIGS. 26(a) and 26(b), the projection 305b is displaced toward the rectilinear motion tube 310 while being in contact with the inner wall part of the fore end tube 309 until the projection 305b comes to a stop retaining a predetermined clearance between the projection 305b and the fore end 305a.

The projection 304b of the other spring 304 is likewise displaced toward the rectilinear motion tube 310 while being in contact with the inner wall part of the fore end tube 309 until the projection 304b comes to a stop.

When the rectilinear motion tube 310 is drawn out toward the object (in the direction of +Z), the pushing face 310a of the rectilinear motion tube 310 causes the projection 305b of the spring 305 to move in the direction of +Z. Then, as shown in FIG. 26(c), the projection 305b comes into contact with another part of the spring 305 on the side of the fore end part 305a to displace the fore end part 305a in the direction of +Z. The displacement of the fore end part 305a causes the barrier member 302 to swing on its rotation shaft 302b. The fore end of the barrier member 302 then collides against a stopper part 308j of the base seat 308 to bring the barrier member 302 to a stop at a closed position. The other barrier member 303 likewise comes to a stop at its closed position. At this time, the hole part 302a of the barrier member 302 in which the fore end part 305a of the spring 305 is fitted is at an angle of −45 degrees with respect to the center of swing and with respect to the XY plane which passes the center of swing. Then, the other barrier member 303 closes in the same manner and has its hole part 303a also at the angle of −45 degrees.

With the lens barrel 300 in the seventh embodiment arranged as described above, the seventh embodiment gives the following advantages, in addition to advantages which are the same as the advantages of the fifth embodiment:

The part of the spring 305 extending from the fixed part 305d to the fore end part 305a and another part extending from the fixed part 305d to the projection 305b are separately arranged. Therefore, the movement of a connection part between the spring 305 and the barrier member 302 and the movement on the XY plane of a contacting part between the spring 305 and the rectilinear motion tube 310 do not interfere with each other, to permit transmission of only such forces that are required for opening and closing the barrier member 302. Further, since the projection 305b of the spring 305 is in the state of being urged in the direction of the outside diameter of the lens barrel, the projection 305b comes into contact with the pushing face 310a of the rectilinear motion tube 310 without fail when the projection 305b is pushed by the rectilinear motion tube 310. The arrangement precludes the occurrence of such a trouble that the projection 305b of the spring 305 comes outside of the pushing face 310a of the rectilinear motion tube 310 by slipping in the direction of the inside diameter of the lens barrel.

(Eighth Embodiment)

A barrier opening-and-closing device according to an eighth embodiment of the invention is next described below with reference to FIGS. 27(a) to 27(d).

Figure 27:
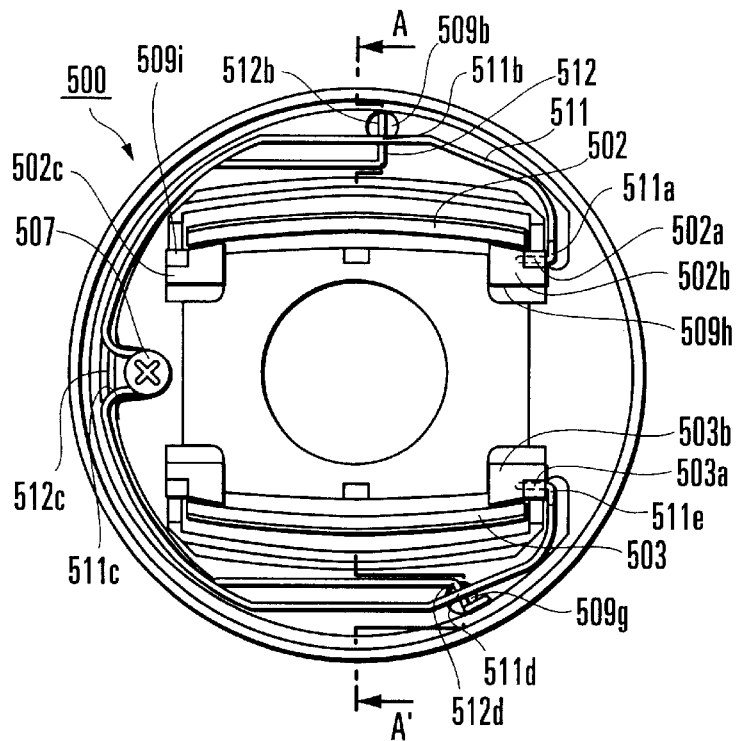
FIGS. 27(a) to 27(d) show a barrier device according to an eighth embodiment of the invention, FIG. 27(a) being a front view showing the barrier device in a state of having a barrier at an open position with a fancy cover excluded from the illustration, FIG. 27(b) being a side view showing the barrier device in a state of having the barrier at the open position with a sectional view including the YZ plane showing only the fancy cover and a fore end tube, FIG. 27(c) being a side view showing the barrier device in a state of having the barrier at a closed position, and FIG. 27(d) being a top view showing springs in the barrier device in a look-through manner.
Figure 27:
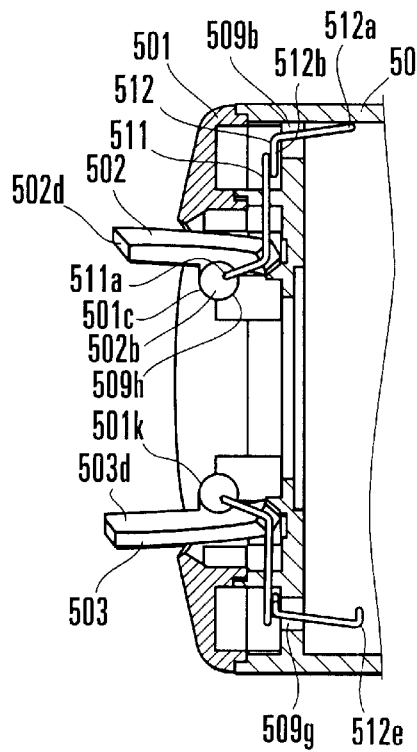
Figure 27:
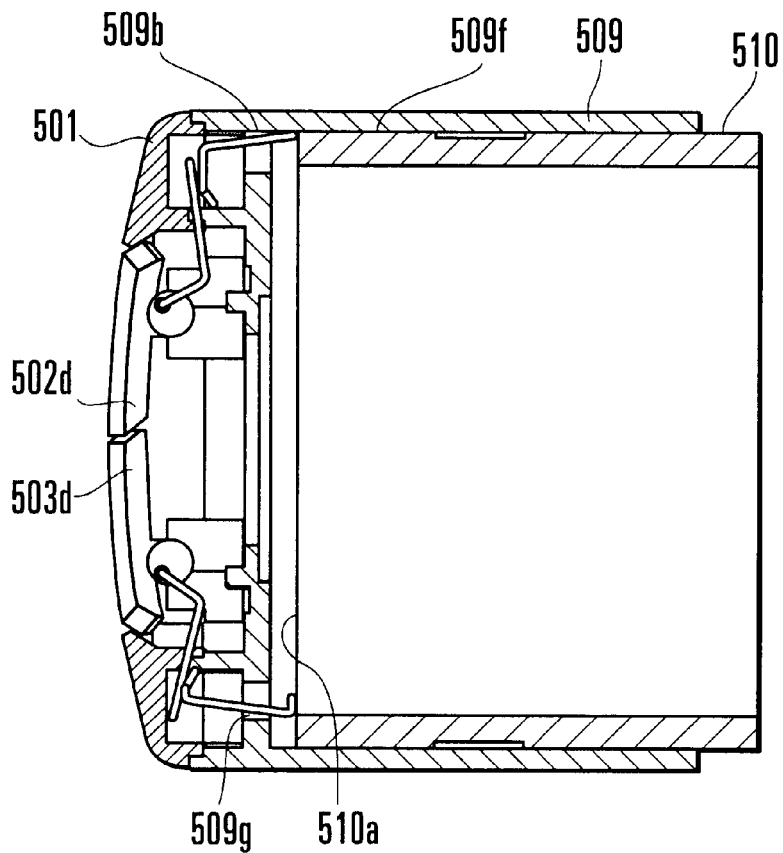
Figure 27:
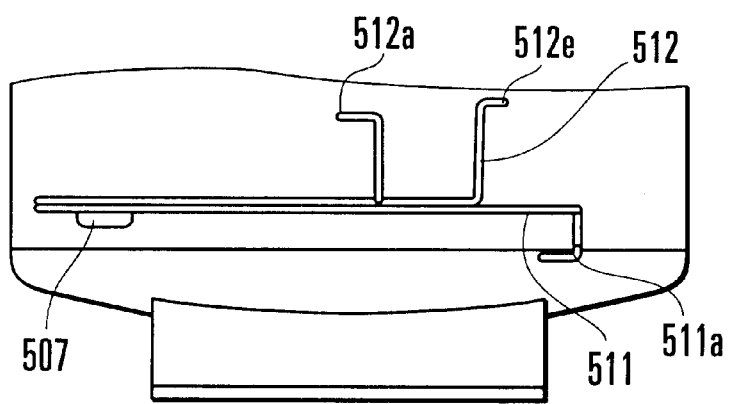

FIGS. 27(a) to 27(d) show essential parts of a lens barrel 500 having the barrier opening-and-closing device according to the eighth embodiment. FIG. 27(a) is a front view showing a barrier in an open state with a fancy cover excluded from the illustration. FIG. 27(b) is a side view showing the barrier in the open state with a sectional view including a YZ plane showing only the fancy cover and a fore end tube. FIG. 27(c) is a sectional side view showing the barrier in a closed state. FIG. 27(d) is a look-through view showing springs as viewed from above with the barrier in the open state.

Referring to FIGS. 27(a) to 27(d), the lens barrel 500 has a fore end tube 509, a rectilinear motion tube 510 arranged to be rectilinearly slidable in a state of being fitted in the fore end tube 509, a pair of barrier members 502 and 503, a spring 511 arranged as a first urging member to urge the barrier members 502 and 503, a spring 512 arranged as a second urging member to be pushed by the rectilinear motion tube 510, a screw 507 arranged to secure the springs 511 and 512 to the rectilinear motion tube 510, and a fancy cover 501. The rectilinear motion tube 510 is arranged to be in one body with a base seat part which is arranged in the same manner as described in the foregoing embodiments. The springs 511 and 512 and the barrier members 502 and 503 are thus mounted directly on the rectilinear motion tube 510.

Further, the rectilinear motion tube 510, the fancy cover 501, the barrier members 502 and 503 and the screw 507 are arranged approximately in the same manner as in each of the foregoing embodiments disclosed.

The barrier member 502 has rotation shafts 502b and 502c fitted in the bearing parts 509h and 509i of the fore end tube 509 and is swingably secured to a bearing part 501c of the fancy cover 501. Further, as shown in FIG. 27(c), the barrier member 502 has its fore end part 502d in a so-called tapered shape which is arranged to have the fore end part 503d of the other barrier member 503 inserted there on the inner circumferential side of the fore end part 502d.

In the eighth embodiment, the arrangement of the springs 511 and 512, the positions and number of screws to be screwed into the rectilinear motion tube 510 differ from those in each of the other embodiments described above.

The spring 512 which is the second urging member is disposed in front of the fore end tube 509. As shown in FIG. 27(a), the spring 512 is formed approximately in a C shape as a whole. The two ends of the C shape of the spring 512 extend toward the rectilinear motion tube 510 (in the direction of −Z) in parallel with an optical axis, as shown in FIGS. 27(b) to 27(d). More specifically, the first (upper) fore end part 512a which is shown in FIG. 27(a) extends toward the rectilinear motion tube 510 through a first hole part 509b of the fore end tube 509. The second (lower) end part 512d extends toward the rectilinear motion tube 510 through a second hole part 509g of the fore end tube 509.

The spring 511 which is the first urging member is formed approximately in a C shape as a whole as shown in FIG. 27(a). The spring 511 is arranged to overlap the spring 512.

The two ends of the spring 511 are a first end part 511a which is provided for connection to the barrier member 502 and a second end part 511e which is for connection to the barrier member 503. The spring 511 has an intermediate part 511c secured to the fore end tube 509 with the screw 507.

The spring 511 has the first end part 511a fitted in a hole part 502a of the upper barrier member 502 and the second end part 511e fitted in a hole part 503a of the lower barrier member 503. The intermediate part 512c of the spring 512 is interposed in between the front face of the fore end tube 509 and the other spring 511 in such a way as to prevent the springs 511 and 512 from coming off their positions. The first fore end part 512a and the second fore end part 512e of the spring 512 are urged toward the outside diameter of the lens barrel in a state of being constantly in contact with the inner face 509f of the rectilinear motion tube 510.

When the spring 512 is not pushed by the rectilinear motion tube 510, the first and second fore end parts 511a and 511e of the other spring 511 try to flex toward the rectilinear motion tube 510 (in the direction of −Z). Therefore, with the spring 512 not pushed as shown in FIG. 27(b), the spring 511 causes the barrier members 502 and 503 to swing on their rotation shafts 502b and 503b. As a result, the barrier is open. Further, under this condition, as shown in FIG. 27(a), the two springs 511 and 512 are in contact with each other at predetermined parts to have the spring 512 pushed by the spring 511 toward the rectilinear motion tube 510 (in the direction of −Z).

More specifically, the spring 511 is in contact with the first (upper) contact part 512b and the second (lower) contact part 512d of the spring 512 at its first (upper) contact part 511b and its second (lower) contact part 511d. When the spring 512 is pushed toward the rectilinear motion tube 510 under this condition, the first and second fore end parts 512a and 512e of the spring 512 come to be pushed out toward the rectilinear motion tube 510. At this time, as shown in FIG. 27(d), the second (lower) fore end part 512e of the spring 512 comes to protrude further toward the rectilinear motion tube 510 than the first (upper) fore end part 512a.

When the rectilinear motion tube 510 moves toward the barrier members 502 and 503 as shown in FIG. 27(c), the pushing face 510a of the rectilinear motion tube 510 first pushes the second fore end part 512e of the spring 512 in the direction of +Z. Then, the second contact part 512d of the spring 512 pushes up the second contact part 511d of the spring 511. This causes the second fore end part 511e of the spring 511 to be displaced in the direction of +Z, and causes the lower barrier member 503 to sing in the direction of closing. The barrier member 503 thus first begins to close. After that, the first fore end part 512a of the spring 512 is pushed by the pushing face 510a of the rectilinear motion tube 510. That causes the first contact part 512b of the spring 512 to push up the first contact part 511b of the spring 511. The first fore end part 511a of the spring 511 is displaced in the direction of +Z to cause the barrier member 502 to swing in the direction of closing. The barrier member 502 thus also begins to close. The barrier members 503 and 502 eventually completely close, as shown in FIG. 27(c).

Further, when the rectilinear motion tube 510 moves from this position shown in FIG. 27(c) in the direction of −Z, the elastic force of the spring 511 causes the first and second fore end parts 511a and 511d of the spring 511 to be displaced toward the rectilinear motion tube 510. Then, the upper barrier member 502 first begins to open. Following this, the lower barrier member 503 begins to open. Both the barrier members 503 and 502 eventually open to a full extent, as shown in FIG. 27(b).

With the lens barrel 500 in the eighth embodiment arranged as described above, the eighth embodiment gives the following advantages in addition to advantages which are the same as the advantages of the fifth embodiment.

Without increasing the number of springs which are urging means from two, one spring 512 is arranged to be used solely for contact with the rectilinear motion tube 510 while the other spring 511 is arranged to be used solely for connection to the barrier members. When the spring 512 is pushed by the rectilinear motion tube 510, the spring 512 pushes the spring 511 to open the barrier members. Therefore, the wire diameters of these springs 512 and 511 can be selected separately according to their roles, so that a barrier opening-and-closing device can be arranged to smoothly perform its opening and closing actions. The arrangement also permits omission of parts such as a screw otherwise necessary for fixing the spring 512 as a second urging member. The reduction of the number of necessary parts permits reduction in cost.

One of the barrier members, i.e., the barrier member 502 is arranged to open and close prior to the other barrier member 503, and the impact of contact of the protrusions of the barrier members which otherwise takes place once is divided into two times, so that the force and sound of the collision can be lessened to make the rectilinear motion tube 510 drivable by a smaller force.

When the barrier is closed, the two barrier members 502 and 503 overlap each other at their fore end parts. Therefore, dust, external light, etc., can be prevented from intruding into the lens barrel.

In each of the fifth, sixth and seventh embodiments disclosed, the length of projection of one spring extending toward the rectilinear motion tube is arranged to be equal to that of the other spring. This arrangement may be changed to have these projections differ in length from each other, as in the case of the eighth embodiment. Such a modification also has the same advantages as those of the eighth embodiment.

The lens barrel having the barrier opening-and-closing device arranged as described in the foregoing enables a camera to take pictures with a higher quality.

What is claimed is:

1. An optical apparatus comprising:
   a) a barrier member disposed in front of a lens and arranged to be openable and closable;
   b) an urging member arranged to exert an urging force on said barrier member; and
   c) an abutting member arranged to be capable of abutting on said urging member, said abutting member moves forward and backward along the direction of an optical axis of the lens, wherein, when said abutting member abuts on said urging member, said urging member exerts on said barrier member an urging force acting in a direction of closing said barrier member, and, when said abutting member does not abut on said urging member, said urging member exerts on said barrier member an urging force acting in a direction of opening said barrier member.

2. An optical apparatus according to claim 1, wherein said barrier member is arranged to swing around an axis which is perpendicular to an optical axis of said lens.

3. An optical apparatus according to claim 2, wherein said barrier member includes a first barrier member having an axis of swing thereof located above the optical axis of said lens, and a second barrier member having an axis of swing thereof located below the optical axis of said lens.

4. An optical apparatus according to claim 1, wherein said urging member is a spring member having one end thereof engaging said barrier member.

5. An optical apparatus according to claim 4, wherein said spring member has an extending part which extends along the optical axis of said lens, said extending part being arranged to abut on said abutting member.

6. An optical apparatus according to claim 4, wherein said barrier member is provided with a hole for allowing a fore end part of said spring member to be inserted therein, said barrier member and said spring member being connected to each other with the fore end part of said spring member inserted into the hole of said barrier member.

7. An optical apparatus according to claim 6, wherein the hole of said barrier member is formed at a position located away from the center of swing of said barrier member.

8. An optical apparatus according to claim 1, wherein said urging member is an elastic member formed in an elliptic ring shape.

9. An optical apparatus according to claim 1, wherein light-blocking grooves are formed on an inner side of said barrier member.

10. An optical apparatus according to claim 1, further comprising a cover member arranged to hold said barrier member, a surface of said cover member being formed in a spherical shape.

11. An optical apparatus according to claim 10, wherein said barrier member and said cover member are formed such that a boundary line between said barrier member and said cover member becomes an arc which is approximately equivalent to curvature of the surface of said cover member.

12. An optical apparatus according to claim 1, wherein said abutting member is a lens holding member.

13. An optical apparatus according to claim 12, wherein said lens holding member is movable between a photo-taking position and a stowed position, and abuts on said urging member when said lens holding member is located at the stowed position.

14. An optical apparatus according to claim 10, wherein said urging member is disposed in a space shielded from light by said cover member.

15. An optical apparatus according to claim 10, wherein said cover member is provided with a wall part formed to block light.

16. An optical apparatus comprising:
   a) an optical system having a plurality of lens groups;
   b) a barrier member disposed at a front end of said optical system, said barrier system is arranged to swing around an axis which is perpendicular to an optical axis of said optical system; and
   c) an opening-and-closing mechanism for opening and closing said barrier member, said opening-and-closing mechanism being arranged to vary an opened position of said barrier member according to a focal length of said optical system, the opened position of said barrier member having a first state with the opened position of said barrier member being fully opened when the focal length of said optical system is short and a second state with the opened position of said barrier member being less opened than in the first state when the focal length of said optical system is long.

17. An optical apparatus according to claim 16, wherein said barrier member includes a first barrier member having an axis of swing thereof located above the optical axis of said optical system, and a second barrier member having an axis of swing thereof located below the optical axis of said optical system.

* * * * *

UNITED STATES PATENT AND TRADEMARK OFFICE
CERTIFICATE OF CORRECTION

PATENT NO. : 6,443,634 B1
DATED : September 3, 2002
INVENTOR(S) : Takayuki Tsuboi It is certified that error appears in the above-identified patent and that said Letters Patent is hereby corrected as shown below:

Column 4,
Line 55, delete "40b" and insert -- 401b --.

Column 6,
Line 18, delete "member" and insert -- members --.
Line 55, delete "ratable" and insert -- rotatable --.

Column 8,
Line 5, delete "end." and insert -- end --.

Column 10,
Line 43, delete "1004" and insert -- 1026 --.

Column 11,
Line 30, delete "110" and insert -- 110b --.

Column 12,
Line 42, delete "10b" and insert -- 102b --.

Column 13,
Line 2, delete "fixing" and insert -- fixed --.

Column 16,
Line 54, delete "removable" and insert -- removal --.

Column 17,
Line 31, delete "101c" and insert -- 103c --.

Column 20,
Line 14, delete "208" and insert -- 206 --.

UNITED STATES PATENT AND TRADEMARK OFFICE
CERTIFICATE OF CORRECTION

PATENT NO.     : 6,443,634 B1
DATED          : September 3, 2002
INVENTOR(S)    : Takayuki Tsuboi It is certified that error appears in the above-identified patent and that said Letters Patent is hereby corrected as shown below:

Column 24,
Line 48, delete "sing" and insert -- swing --.

Signed and Sealed this

Twenty-eighth Day of October, 2003

JAMES E. ROGAN
*Director of the United States Patent and Trademark Office*